United States Patent
Al-Fuqaha et al.

(10) Patent No.: US 10,255,043 B2
(45) Date of Patent: Apr. 9, 2019

(54) FIELD PROGRAMMABLE BLOCK SYSTEM DELIVERING CONTEXT-AWARE SERVICES IN RESOURCE-CHALLENGED ENVIRONMENTS

(71) Applicant: Western Michigan University Research Foundation, Kalamazoo, MI (US)

(72) Inventors: Ala Al-Fuqaha, Kalamazoo, MI (US); Lori J. Brown, Kalamazoo, MI (US); Ihab Ahmed Mohammed, Kalamazoo, MI (US)

(73) Assignee: Board Of Trustees Of Western Michigan University, Kalamazoo, MI (US)

( * ) Notice: Subject to any disclaimer, the term of this patent is extended or adjusted under 35 U.S.C. 154(b) by 0 days.

(21) Appl. No.: 15/642,490

(22) Filed: Jul. 6, 2017

(65) Prior Publication Data

US 2018/0011694 A1    Jan. 11, 2018

Related U.S. Application Data

(60) Provisional application No. 62/360,007, filed on Jul. 8, 2016.

(51) Int. Cl.
*G06F 9/44* (2018.01)
*G06F 8/30* (2018.01)
(Continued)

(52) U.S. Cl.
CPC ............... *G06F 8/30* (2013.01); *G06F 8/20* (2013.01); *G06F 8/34* (2013.01); *G06F 8/36* (2013.01);
(Continued)

(58) Field of Classification Search
CPC ...... G06F 8/30; G06F 8/20; H04L 67/12; G05B 19/052
See application file for complete search history.

(56) References Cited

U.S. PATENT DOCUMENTS 8,396,485 B2   3/2013   Grainger et al.
8,847,754 B2   9/2014   Buchheim et al.
(Continued)

OTHER PUBLICATIONS

D. Benhaddou and A. Al-Fugaha, Eds., Wireless Sensor and Mobile Ad-Hoc Networks. New York, NY: Springer New York, (2015). [Online]. Available: https://link.springer.com/10.1007/978-1-4939-2468-4.

(Continued)

*Primary Examiner* — Tuan A Vu
(74) *Attorney, Agent, or Firm* — Harness, Dickey & Pierce, P.L.C.

(57) ABSTRACT

The programmable communication system supports communication between both user devices message broker server(s) using a processor-based programmable modular block device implementing an execution engine and programmed to communicate with other processors through a message broker server using a predefined communication protocol. The block device includes a device port for coupling to sensor(s) and actuator(s), and a communication port to communicate with other processors using said predefined communication protocol. An editor program discovers and acquires information about the block device and about other devices in communication with the block device directly or via a message broker. The editor generates and downloads to the block device a rules-based program based on the acquired information. The block device uses the execution engine to execute the program and thereby obtain information through the ports and provide information and control signals.

21 Claims, 24 Drawing Sheets

(51) Int. Cl.
 G06F 8/34 (2018.01)
 H04L 29/08 (2006.01)
 H04L 12/58 (2006.01)
 G06F 8/36 (2018.01)
 G06F 8/38 (2018.01)
 G06F 8/20 (2018.01)
 G06F 8/41 (2018.01)
 G06N 99/00 (2019.01)

(52) U.S. Cl.
 CPC .................. *G06F 8/38* (2013.01); *G06F 8/41* (2013.01); *G06N 99/005* (2013.01); *H04L 51/18* (2013.01); *H04L 67/12* (2013.01)

(56) References Cited

U.S. PATENT DOCUMENTS

| | | | |
|---|---|---|---|
| 8,965,398 | B2 | 2/2015 | Zhu et al. |
| 9,204,257 | B1 | 12/2015 | Mendelson |
| 9,396,344 | B1 | 7/2016 | Jones |
| 9,516,474 | B2 | 12/2016 | Finnerty et al. |
| 2013/0055196 | A1* | 2/2013 | Canedo ...................... G06F 8/30 717/104 |
| 2014/0220883 | A1 | 8/2014 | Emigh et al. |
| 2014/0375421 | A1 | 12/2014 | Morrison et al. |
| 2017/0026794 | A1 | 1/2017 | Baker et al. |
| 2017/0251338 | A1 | 8/2017 | Huberman et al. |

OTHER PUBLICATIONS

J. Skrberg, Using Bluetooth beacons in a museum, M.S. thesis, University of Oslo, Oslo, Norway, (2016).
W. Posdorfer and W. Maalej, Towards Context-aware Surveys Using Bluetooth Beacons, Procedia Computer Science, vol. 83, pp. 42 49, (2016) [Online]. Available: http://www.sciencedirect.com/science/article/pii/S187705091630120X.
D. Sellers, Google Eddystone is eating into Apples iBeacon share of the beacon market, Jan. 26-(2016) [Online]. Available: http://www.appleworld.today/blog/2016/1/26/google-eddystone-is-eating-into-apples-ibeacon-share-of-the-beacon-market.
iBeacon market to break 60 Million by 2019—iBeacon.com Insider, (Jul. 11, 2014) [Online]. Available: http://www.ibeacon.com/ibeacon-market-to-break-60-million-by-2019/.
Z. Epstein, Apple: Indoor location a $4 billion market opportunity—BGR. [Online]. Available: http://bgr.com/2013/10/18/apple-indoor-location-4-billion-market-opportunity (Accessed: Apr. 26, 2018).
What is iBeacon? A guide to Beacons—iBeacon.com Insider [Online]. Available: http://www.ibeacon.com/what-is-ibeacon-a-guide-to-beacons/ (Accessed: Apr. 26, 2018).
Global ibeacon Market 2015-2019, TechNavio, 3384062, Aug 2015.
C. Forrest, Googles Eddystone could be real competition for Apples iBeacon-TechRupublic, (Jul. 21, 2015). [Online]. Available: http://www.techrepublic.com/article/googles-eddystone-could-be-real-competition-for-apples-ibeacon/ (Accessed: Apr. 26, 2018).
Context Aware Computing Market—Global Advancements, Emerging Applications, Worldwide Forecasts and Analysis (2013-2018), MarketsandMarkets, Tech. Rep. TC 1134, Mar. 2013 [Online]. Available: http://www.marketsandmarkets.com/Market-Reports/context-aware-computing-market-763.html (Accessed Apr. 26, 2018).
Location-Based Services (LBS) Market by Technology & Software—2021—MarketsandMarkets. [Online]. Available: https://www.marketsandmarkets.com/Market-Reports/location-based-service-market-96994431.html (Accessed: Apr. 26, 2018).
S. Sorrell, Mobile Context & Location Services Navigation, Tracking, Social & Local Search 2014-2019. Juniper, Aug. 13, 2014.
Unlocking the potential of the Internet of Things—McKinsey & Company. [Online]. Available: https://www.mckinsey.com/business-functions/digital-mckinsey/our-insights/the-internet-of-things-the-value-of-digitizing-the-physicla-world (Accessed: Apr. 26, 2018).
J. Manyika, M. Chui, P. Bisson, J. Woetzel, R. Dobbs, J Bughin, and D. Aharon, The Internet of Things: Mapping the Value Beyond the Hype, McKinsey Global Institute, Jun. 2015.
Top Strategic Predictions for 2016 and Beyond: The Future is a Digital Thing. [Online]. Available: https://www.partner.com/doc/3142020?retval-&pcp=mpe (Accessed: Apr. 26, 2018).
Focus on Startups and Small Vendors as Drivers for IoT Innovation [Online]. Available: https://www.gartner.com/doc/3083422?ref=SiteSearch&sthkw=lot&fnl=search&srcld=1-3478929(Accessed: Apr. 26, 2018)2254.
V.Afshar, Cisco: Enterprises Are Leading the Internet of Things Innovation, Aug. 2017. [Online]. Available: https:www.huffingtonpost.com/entry/cisco-enterprises-are-leading-the-internet-of-things_us_59a41fcee4b0a62d0987b0c6 (Accessed: Apr. 26, 2018).
Mass Adoption of the Internet of Things Will Create New Opportunities and Challenges for Enterprises. [Online] Available: https://www.gartner.com/doc/29948717?ref=SiteSearch&sthkw=internet%20of%20things&fnl=search&srcld=1-3478922254 (Accessed: Apr. 26, 2018).
Microsoft by the Numbers [Online]. Available: http://news.microsoft.com/bythenumbers/planet-office (Accessed: Apr. 26, 2018).
Beacon Tech Overview—Estimote Developer. [Online] Available: http://www.gimbal.com/gimbal-beacons/ (Accessed: Apr. 26, 2018).
Gimbal Beacons & Firmware—Gimbal. [Online]. Available: http://www.gimbal.com/gimbal-beacons/ (Accessed: Apr. 26, 2018).
We Make Proximity Work Radius Networks. [Online]. Available: http://www.radiusnetworks.com/ (Accessed: Apr. 26, 2018).
Kontakt.io: Beacons & Beyond [Online]. Available: http://kontat.lo/ (Accessed: Apr. 26, 2018).
M.A. Salahuddin, A. Al-Fuqaha, M. Guizani, K. Shuaib, and F. Sallabi, Softwarization of internet of things infrastructure for secure and smart healthcare, Computer, vol. 50, No. 7, pp. 7479, 2017.
A. Al-Faqaha, M. Guizani, M. Mohammadi, M. Aledhari, and M. Ayyash, Internet of Things: A Survey on Enabling Technologies, Protocols, and Applications, IEEE Communications Surveys & Tutorials, vol. 17, No. 4, pp. 23472376, 2015.
C. Perera, A. Zaslaysky, P. Christen, and D. Georgakopoulos, Context Aware Computing for the Internet of Things: A Survey, IEEE Communications Surveys & Tutorials, vol. 16, No. 1, pp. 414454, 2014.
W. He, P.H. Ho, and J. Tapolcai, Beacon deployment for unambiguous positioning, IEEE Internet of Things Journal, vol. 4, No. 5, pp. 13701379, Oct. 2017.
A. Al-Fuqaha, A. Khreishah, M. Guizani, A. Rayes, and M. Mohammadi, Toward better horizontal integration among iot services, IEEE Communications Magazine, vol. 53, No. 9, pp. 7279, Sep. 2015.
Perera, D.S. Talagala, C.H. Liu, and J.C. Estrella, Energy-efficient location and activity-aware on-demand mobile distributed sensing platform for sensing as a service in iot clouds, IEEE Transactions on Computational Social Systems, vol. 2, No. 4, pp. 171181, Dec. 2015.
D. Martin, C. Lamsfus, and A. Alzua-Sorzabal, A cloud-based platform to develop context-aware mobile applications by domain experts, Computer Standards & Interfaces, vol. 44, pp. 177184, Feb. 2016.
B. Chihani, E. Bertin, and N Crespi, Programmable context awareness framework, Journal of Systems and Software, vol. 92, pp. 5970, Jun. 2014.
C. Perera, C.H. Liu, S. Jayawardena, and Min Chen, A survey on Internet of Things From Industrial Market Perspective, IEEE Access, vol. 2, pp. 16601679, 2014.
A. AlFuqaha, M. Elbes, and A. Rayes, an Intelligent data fusion technique based on the particle filter to perform precise outdoor localization, International Journal of Pervasive Computing and Communications, vol. 9, No. 2, pp. 163183, 2013.
A. Gharaibeh, A. Khreishah, M. Mohammadi, A. Al-Fuqaha, I. Khalil, and A. Rayes, Online auction of cloud resoures in support of the internet of things, IEEE Internet of Things Journal, vol. 4, No. 5, pp. 15831596, Oct. 2017.
K.E. Jeon, J. She, P. Soonsawad, and P.C. Ng, Ble beacons for internet of things applications: Survey, challenges, and opportunities, IEEE Internet of Things Journal, vol. 5, No. 2, pp. 811828, Apr. 2018.

(56) References Cited

OTHER PUBLICATIONS

H. Akcan and C. Evrendilek, Complexity of energy efficient localization with the aid of a mobile beacon, IEEE Communications Letters, vol. 22, No. 2, pp. 392395, Feb. 2018.

M. Farooq-I-Azam, Q. Ni, and E.A. Ansari, Intelligent energy efficient localization using variable range beacons in industrial wireless sensor networks, IEEE Transactions on Industrial Informatics, vol. 12, No. 6, pp. 22062216, Dec. 2016.

A. Al-Fuqaha, A. Rayes, M. Guizana, M. Khanvilkar, and M. Ahmed, Intelligent service monitoring and support, in 2009 IEEE International Conference on Communications, Jun. 2009, pp. 16.

A. Jarrar and E. Jaser, Context aware yr using ble beacons, in 2017 International Conference on New Trends in Computing Sciences (ICTCS), Oct 2017, pp. 303308.

E. Frontoni, A. Mancini, R. Pierdicca, M. Sturari, and P. Zingaretti, Analysing human movements at mass events: a novel mobile-based managment system based on active beacons and avm, in 2016 24th Mediterranean Conference on Control and Automation (MED), Jun. 2016, pp. 605610.

A.I. Kyritsis, P. Kostopoulos, M. Deriaz, and D. Konstantas, A blebased probablistic room-level localitzation method, in 2016 International Conferene on Localization and Gnss (ICL-GNSS), Jun. 2016, pp. 16.

P. Jain, S.S. Khanwalkar, R. Malhotra, A. Dheenrajappa, G. Gupta, and A. Kobsa, ubeacon: Configuration based beacon tracking, in 2016 IEEE International Conference on Pervasive Computing and Communication Workshops (PerCom Workshops), Mar. 2016, pp. 14.

A.M. Bernardos, L. Bergesio, E. Metola, D. Ortiz, and J.R. Caser, Deploying a btle positioning system: Practical issues on calibration, in 2017 IEEE 28th Annual International Symposium on Personal, Indoor, and Mobile Radio Commuications (PIMRC), Oct. 2017, pp. 16.

K. Eksen, T Serif, G. Ghinea, and T.M. Grnli, inloc: Location-aware emergency evacuation assistant, in 2016 IEEE International Conference on Computer and Information Technology (CIT), Dec. 2016, pp. 5056.

P. Dickenson, G. Cielniak, O. Szymanezyk, and M. Mannion, Indoor positioning of shoppers using a network of bluetooth low energy beacons, in 2016 International Conference on Indoor Positioning and Indoor Navigation (IPIN), Oct. 2016, pp. 18.

Sensoro. [Online]. Available: http://www.sensoro.com/, (Accessed: Apr. 26, 2018).

BlueCats-Spatial Intelligence Platform. [Online]. Available: http://bluecats.com/ (Accessed: Apr. 26, 2018).

Buy iBeacon certified Bluetooth LE beacons—BLE Beacons, proximity and hyper-local apps. [Online]. Available: http://bluesensenetworks.com/ (Accessed: Apr. 26, 2018).

Gelo. [Online] Available: http://www.gelgelo.com/ (Accessed: Apr. 26, 2018).

iBeacon compatible sensors, IOS and Android iBeacon info. [Online]. Available: https://glimwormbeacons.com/ (Accessed: Apr. 26, 2018).

Accent Systems home—Accent Systems. [Online}. Available: http://accent-systems.com/ (Accessed: Apr. 26, 2018).

UPNEXT—We design and develop. You grow. [Online]. Available: https://upnext.lo/ (Accessed: Apr. 28, 2018).

Beaconstac, Proximity Marketing using Bluetooth Beacon Technology. [Online]. Available: https://www.beaconstac.com (Accessed: Apr. 28, 2018).

I.S. Analytics, Features—MOCA Platform—Big Data and ibeacons platform. [Online]. Avaialble: https://www.mocaplatform.com/features. (Accessed: Apr. 28, 2018).

Beacons. [Online]. Available: http://www.ifsworld.com/us/solutions/ifs-applications/ifs-labs/beacons/ (Accessed: Apr. 28, 2018).

Proximity is the perfect partner for mobile technology in the enterprise. [Online]. Available: http://www.multibaseit.com.au/proximity/ (Accessed: Apr. 28, 2018).

iBeacon CMS for Museums, Retail and more. [Online]. Available: http://smartbeacon.it/ (Accessed: Apr. 28, 2018).

BlueUp. [Online]. Available: https://www.blueupbeacons.com/ (Accessed: Apr. 28, 2018).

beaconCUBE. [Online]. Available: http://www.beaconcube.com/ (Accessed: Apr. 28, 2018).

Liki—Give mobile experiences a wake up call. [Online]. Available: http://liki.lo/en (Accessed: Apr. 28, 2018).

Customer Value [Online]. Available: http://proximate.ae/merchant/index.html (Accessed: Apr. 28, 2018).

mobeac USA—Connecting you with your favorite products and services, when you need them! [Online]. Available: http://usa.mobeac.com/ (Accessed: Apr. 28, 2018).

Confidex:: Confidex Viking Bluetooth beacons. [Online]. Available: https://www.confidex.com/products/links-by-confidex-viking?golid=CiwKCAlwt5DXBRAtElwAa3yyEsCWOEamgHlzPnz0vmL2mpbPlclQv0LFokzVrUvJTNsxcioFJMABxoC0SgQAvDBwE (Accessed: Apr. 28, 2018).

* cited by examiner

FIELD PROGRAMMABLE BLOCK SYSTEM DELIVERING CONTEXT-AWARE SERVICES IN RESOURCE-CHALLENGED ENVIRONMENTS

CROSS-REFERENCE TO RELATED APPLICATION

This application claims priority from U.S. provisional patent application 62/360,007 filed on Jul. 8, 2016. The entire content of this priority application is incorporated herein by reference.

FIELD

The present disclosure relates generally to programmable information acquisition and delivery systems.

BACKGROUND

This section provides background information related to the present disclosure which is not necessarily prior art.

The Internet of Things (IoT) promises to transform present day appliances into smart ones by augmenting them with sensing, computation and communication capabilities. One difficulty, however, is that smart devices need to be programmed in order to reach their full potential. In the case of a smart device that is mass produced and deployed by the millions, it is feasible to engage a team of professional programmers to program the devices. On the other hand, in the case of a custom-developed smart device that is to be deployed singularly or in small numbers, it is no longer feasible to rely on professional programmers.

Stated differently, the current manner for developing and deploying mass produced smart devices does not scale to fill the need for thousands or millions of special purpose or custom devices. There are simply not enough professional programmers to do the job. This leaves the end users or novice developers in the position of having to program their own devices. Unfortunately, the technical challenge is too great. Therefore, until this changes, the Internet of Things promise of ubiquitous smart devices is just a pipe dream.

SUMMARY

This section provides a general summary of the disclosure, and is not a comprehensive disclosure of its full scope or all of its features.

The system of the present disclosure, that we call the FlexBeacon system, addresses some of the key shortcomings of present day smart devices by providing a platform that allows end users and novice developers to program and build smart device systems that can be adapted to solve virtually any information acquisition, reporting and control problem that the end user or novice developer can dream up. Through its collection of easy to use editors and its graphical development environment, the disclosed system allows users to design and create programs that can discover and use information from local programmable block devices and also from remote devices and information sources.

In addition, the FlexBeacon system offers an analytics application to extract knowledge from the collected streaming and bulk data. We believe that the type of data collected by the FlexBeacon will enable new basic research in the area of "transient social networks." Such networks come to existence and then disappear quickly.

In accordance with one aspect, the disclosed system provides programmable communication system for use with at least one user device that employs a non-transitory machine-readable medium storing a programmable modular block program which when executed by a processor on a user device causes the processor on said user device to implement an execution engine programmed to execute a user-supplied rules-based program and programmed to communicate with other processors. The rules-based program supports at least one of crisp, fuzzy and binary classifier-based rules that transcend operating on data locally sensed by the user device. If desired, at least some of the rules supported by the rules-based program can be generated using a deep machine learning processor that employs machine learning techniques. In this way, the programmable communication system disclosed here can take advantage of and contribute data to and/or participate in deep machine learning systems.

A non-transitory machine-readable medium stores an editor program which when executed by a processor on a user device causes the processor on said user device to:

discover and acquire first attribute information about the programmable modular block device, discover and acquire second attribute information about a programmable modular block device that is physically separate from the user device, generate the rules-based program based on at least one of the first and second attribute information, and provide the rules-based program to the execution engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
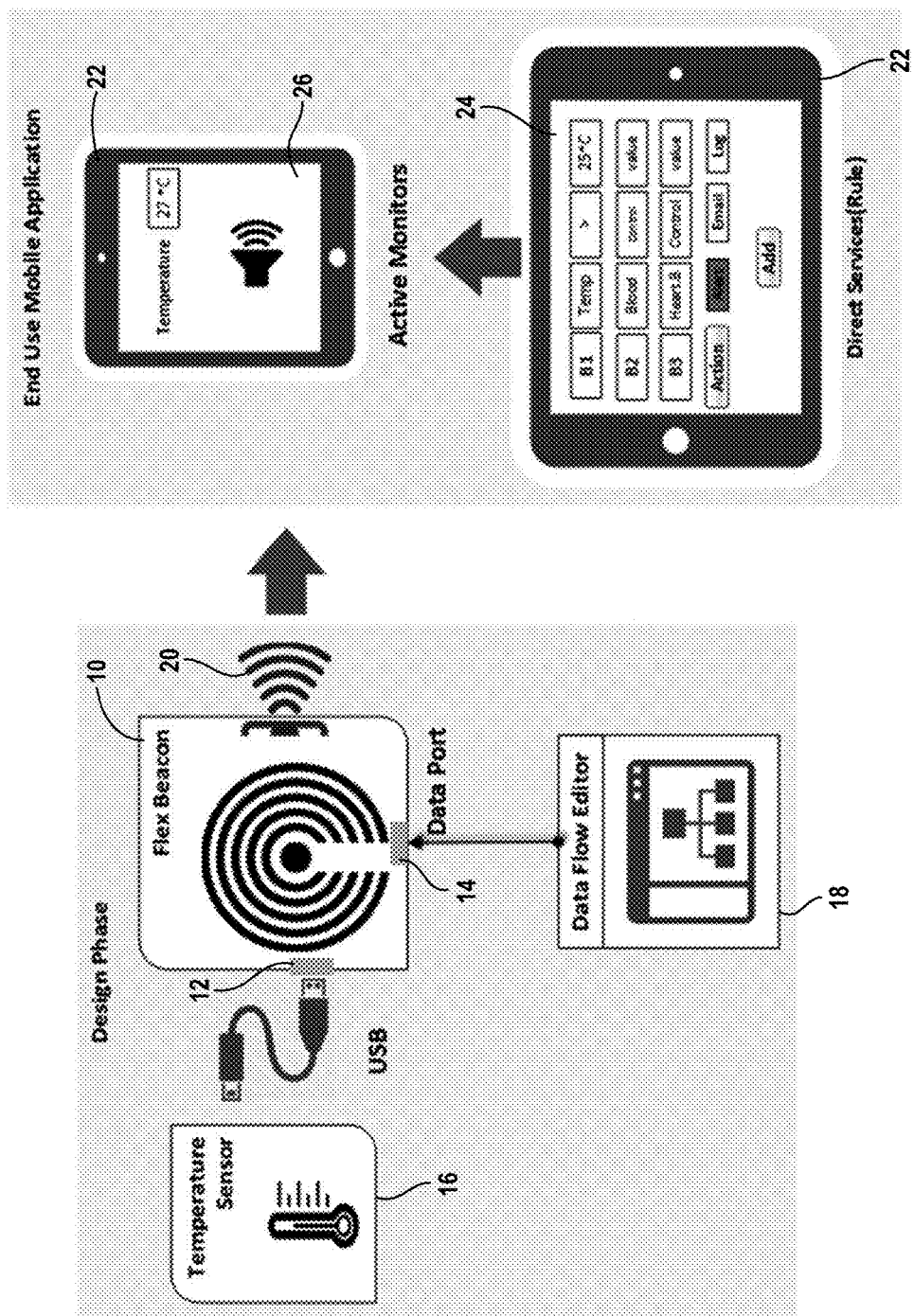
FIG. 1 is an exemplary use case scenario helpful in understanding some of the components of the disclosed system.

Before presenting a detailed explanation of the disclosed technology, an illustrative example of a simple embodiment of the disclosed system will be described in connection with FIG. 1. A programmable block 10, also referred herein as a flex beacon block or flex beacon, has a port 12 with which to couple to a sensor or actuator. The programmable block is supplied with user-supplied executable program through a data port 14. Executing the program the programmable block can provide a variety of different useful functions, such as communicating wirelessly with other devices.

In this specific example a USB temperature sensor 16 is coupled to port 12 using a USB cable. The end-user wishes to use the programmable block to express a rule that sounds an alarm when the temperature is over 80 degrees Fahrenheit. The first step is to connect the sensor to the FlexBeacon hardware. Next, the developer-user utilizes the graphical data-flow editor 18, running on a suitable user device, such as a portable tablet computer, to develop a program that reads data from the sensor and emits wireless signals that express this reading via WI-FI Direct, as indicated at 20. After finishing the design, the developer-user uploads or flashes the resulting program, in the form of an XML/JSON file for example, into the programmable block. The programmable block has now been configured to take temperature readings and to supply those readings wirelessly to suitably programmed user devices, such as end user mobile device 22.

In addition to programming the programmable block, the end user can also create programs that run on the end user mobile device, to consume the data supplied from the programmable block. In this example, the end-user starts the visual rule composer application 24, running on the mobile device 22 for example, switches to the direct connection tab to select one or more sensors, selects the conditions to apply, and finally selects the action to be triggered when the conditions are met. After composing the rule, end-users can see active monitors for their telemetry of interest shown in the display 26 of the mobile device 22.

Architecture

The proposed platform consists of two main parts: hardware and software. The hardware part is a small microcontroller-based board referred to herein as the programmable block or "FlexBeacon" that supports different types of sensors and actuators via supported ports. The micro-controller is responsible for the overall management of the FlexBeacon and the execution of the user-defined rule and flow models and the collection of analytics. The FlexBeacon hardware also includes a M2M modem, Internet modem and a Field Programmable Gate Array (FPGA) chip that allows for faster execution of the user-defined rule and flow models. Note that the FlexBeacon can utilize any M2M modem including BLE, WiFi-Direct, LTE-Direct, or a proprietary implementation using the Software Defined Radio (SDR) technology. The software part consists of the following components:

FlexBeacon Execution Engine: Program that runs on the micro-controller and serves as the execution environment for the used-defined rule and flow models.

Graphical development suite: A tool that consists of three editors: data-flow editor, rule editor, and Graphical User Interface (GUI) editor. This suite is used by developers to implement the logic and rules for the FlexBeacon using the data flow and rules editor. Developers can also use these editors to develop full mobile applications that work with the FlexBeacon hardware.

Message Broker: The message broker provides the FlexBeacon hardware with a publish-subscribe service through which data collected from the FlexBeacon hardware is made available through the Internet and vice versa.

Visual rule composition mobile application: This application provides end-users with an intuitive user interface which allows them to express their interest in monitoring certain data or receiving notifications when certain events are triggered. So the application allows users to monitor sensory data, control actuators, and express their logic using a simple rule-based graphical environment.

API: Enabling developers to design applications that integrate with the FlexBeacon hardware.

Decision Support System: This application aggregates collected analytics from the FlexBeacon hardware nodes under its management. It also provides reporting services to business and operation managers allowing them to make decisions based on the aggregated data collected from the managed FlexBeacon nodes.

Figure 2:
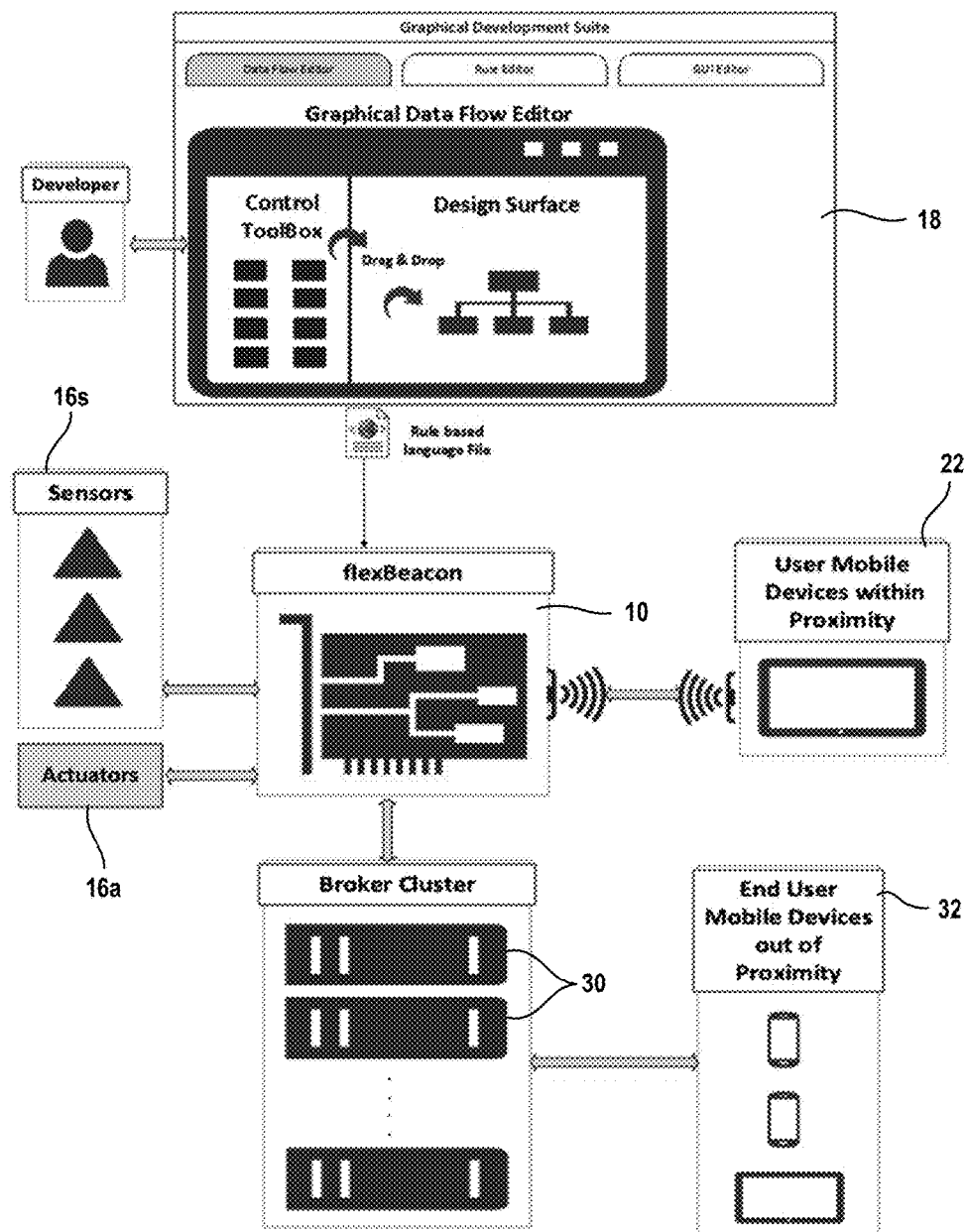
FIG. 2 is a block diagram depicting the overall architecture of the disclosed system.

FIG. 2 shows the main components of the platform. Sensor 16s and actuator 16a devices are interfaced to the proposed FlexBeacon hardware through a variety of physical ports or URL connections over the Internet (e.g., RESTful WebServices). To control the FlexBeacon and configure it as required, the data-flow editor of the graphical development suite is used to generate an XML or JSON formatted file. In addition, the rules editor 18 can be used to inject rules to the FlexBeacon hardware. The FlexBeacon hardware can also send telemetry using through the connected M2M modem or through the Internet and the message broker server(s) 30. Besides allowing users to access and configure sensors and actuators, a general platform-independent mobile application is designed to detect nearby FlexBeacon nodes and update the GUI accordingly. Users or managers can then configure rules to subscribe to receive notifications whenever certain events of interest are triggered. As illustrated, the FlexBeacon or programmable block 10 can communicate locally with user mobile devices within radio frequency communication proximity of the FlexBeacon, and also with end user mobile devices 32 via networked communication managed by the message broker(s) 30.

FlexBeacon Programmable Block Hardware

A programmable communication system for use with a user device and with a message broker server comprising:
a programmable modular block device having:
   a processor programmed to implement an execution engine and further programmed to communicate with other processors through said message broker server using a predefined communication protocol,
   a device port with which to couple with at least one of a sensor and an actuator, and
   a communication port through which the processor can communicate with said user device and with other processors using said predefined communication protocol;
a non-transitory machine-readable medium storing an editor program which when executed by a processor on said user device causes the processor on said user device to:
   discover and acquire first attribute information about the programmable modular block device,
   discover and acquire second attribute information through said message broker server about a second programmable modular block device that is registered with said message broker server,
   generate a rules-based program based on at least one of said first and second attribute information, and
   download said rules-based program to said programmable modular block device;
wherein said programmable modular block device uses said execution engine to execute the rules-based program downloaded to it to obtain information through at least one of said device port and said communication port and to provide output data to effect at least one of provide control signals to said actuator and to provide information signals to said user device.

Figure 3:
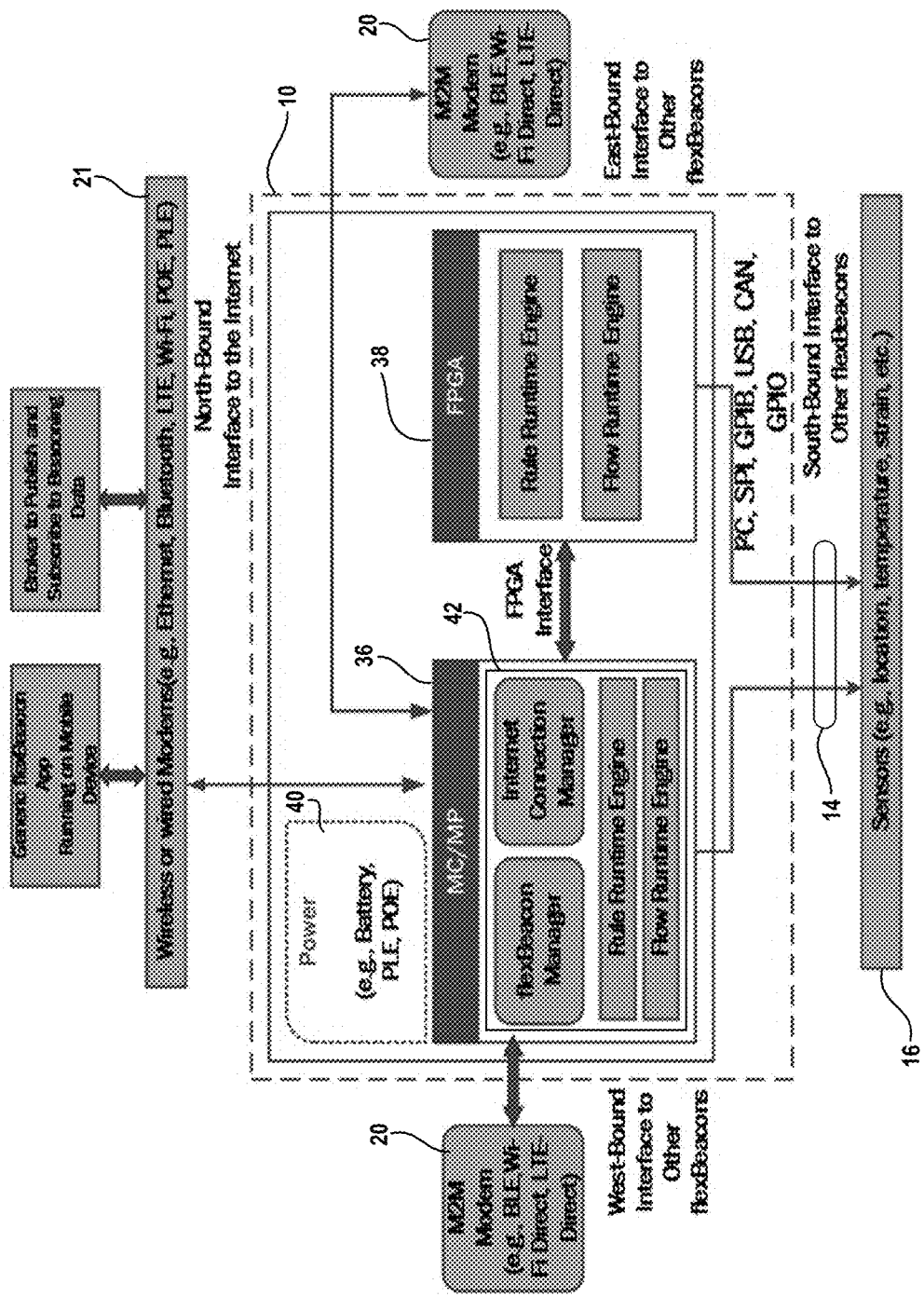
FIG. 3 is a detailed block diagram illustrating the hardware configuration of the programmable block.

The FlexBeacon programmable block hardware is designed to let sensors disseminate their data to other devices and end-users with minimum delay through the use of M2M (machine to machine) communications and a hardware-based rule and data-flow model execution engine. FIG. 3 illustrates the main components of the FlexBeacon programmable block. Referring to FIG. 3, the FlexBeacon programmable block is shown generally at 10. The presently preferred programmable block hardware comprises a microcontroller (MC) or microprocessor (MP) shown at 36 and a field programmable gate array (FPGA) shown at 38. Programmable block 10 also includes a power source 40. The microcontroller/microprocessor 36 and the field programmable gate array 38 each communicate via I/O ports 12 with sensors and/or actuators, shown diagrammatically at 16.

In addition to the sensor ports, the programmable block 10 includes embedded communication capability to perform machine-to-machine (M2M) communication with other FlexBeacon programmable blocks as well as other servers and processors. Thus microcontroller/microprocessor 36 is coupled to one or more wireless communications devices shown diagrammatically at 20. The communications devices may be implemented using a variety of different technologies to support machine to machine (M2M) communication. In the presently preferred embodiment the communications devices are implemented as M2M modems, based on a wireless communication protocol such as BlueTooth (e.g., BLE), Wi-Fi Direct, LTE direct and the like.

In addition, microcontroller/microprocessor 36 of the presently preferred embodiment is also coupled to wireless or wired communications devices (e.g., wireless or wired modems) shown diagrammatically at 21.

The following summarizes the main features that make the FlexBeacon programmable block hardware unique:
General Sensor/Actuator Connectivity: Providing a variety of options for sensors and actuators to be connected to the FlexBeacon including USB, GPIO, GPIB, I2C, SSI/SPI, CANBUS, OBD, Fieldbus, and RS232.
Flexible Power Options: Normal power supply can be used if available. However, in environments where connectivity to a power supply can be a challenge, PoE, PLC, and battery options can be used instead.
Flexible M2M Communication Technologies: Sensors' data is broadcast using WI-FI Direct (Wireless Fidelity), LTE Direct (Long Term Evolution), or BLE (Bluetooth Low Energy) depending on the available technology and required communication range. Furthermore, Software Defined Radio (SDR) can be utilized realize other proprietary M2M protocols.
Flexible Backhaul Options: Telemetry can be sent to a message broker over the Internet using any of the supported wired or wireless communications options: Power Line Communication (PLC), Power over Ethernet (PoE), WI-FI, LTE, and Bluetooth.
Data-Flow Controlled: Developers can program the main microcontroller on the FlexBeacon node using a simple graphical data-flow editor. In addition, this editor enables developers to flash the microcontroller over-the-air by downloading the generated data-flow specifications file to the target FlexBeacon node.
Rule-Based: Besides the data-flow model which represents the logic that executes on the FlexBeacon nodes, rules can be flashed and executed directly on the FlexBeacon instead of executing them on the mobile device. This is especially important for time-sensitive applications that require rules to be executed on the hardware to minimize the latency.

As noted, FlexBeacon programmable block hardware unit shown in FIG. 3 consists of two main programmable components: microcontroller/microprocessor 36 and Field-Programmable Gate Array (FPGA) 38. The FPGA role is to offload the microcontroller from handling the telemetry and executing the rule and data-flow models. The FPGA is an optional component that might not be needed in all applications. However, the microcontroller/microprocessor 36 is the main component of the FlexBeacon programmable block and it implements an execution engine 42 that provides the following services:

a. FlexBeacon Manager: responsible for managing the overall operation of the hardware including communication with the different interfaces.
b. Internet Connection Manager: responsible for sending and receiving data through the Internet and interactions with the message broker.
c. Rule Runtime Engine: responsible for interpreting and executing the user-defined rules.
d. Flow Runtime Engine: responsible for interpreting and executing the user-defined flow-model.

The FlexBeacon programmable block 10 preferably provides four interfaces:
a. East-Bound and West-Bound Interfaces: for communication with other FlexBeacon units through M2M communication technologies. These are identified by reference numeral 20 in FIG. 3.
b. South-Bound Interface: for communication with sensors connected directly to the unit through one of the supported physical connection ports. This is exemplified by port 14 in FIG. 3.
c. North-Bound Interface: for connection with the analytics applications and interaction with the message broker. This is identified by reference numeral 21 in FIG. 3.

The FlexBeacon programmable block hardware device architecture provides a number of advantages. First, by using a unified hardware design, almost any sensor or actuator can be connected to the programmable block. This allows sharing of telemetry and access to remote control services. Second, the programmable block hardware device architecture is cost effective, because the individual programmable block units have the ability to listen to their neighbors and utilize the telemetry that they generate. This eliminates the need to deploy the same sensors on different units. For example, FlexBeacon programmable block units might harvest their location from other units deployed on nearby FlexBeacon programmable block unit. Third, the architecture insulates end users and developers from the need to understand the underlying hardware, interface ports, and communication technologies because the microcontroller program is designed to hide the hardware complexity. Furthermore, the microcontroller program is designed to interpret the rule and data-flow models and execute them locally.

FlexBeacon Programmable Block Execution Engine

At the heart of the FlexBeacon programmable block lies the execution engine 42. The execution engine is responsible for the following tasks:
a. Interpret and execute the data-flow XML/JSON file.
b. Interpret and execute the rules XML/JSON file.
c. Read and write data from/to physical devices.
d. Communicate with the message broker.
e. Publish and subscribe to RESTful WebServices over the Internet.

Graphical Development Suite

Figure 4:
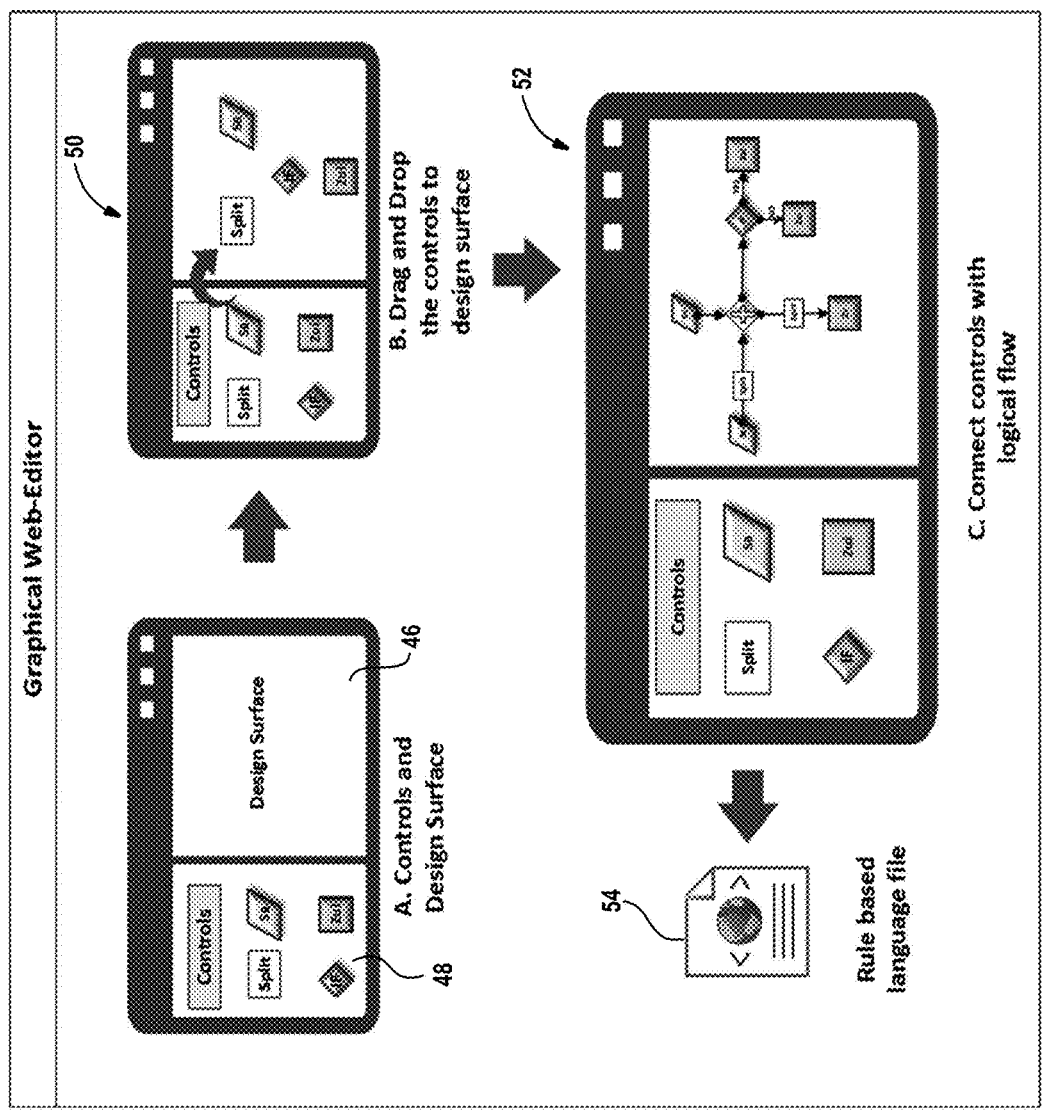
FIG. 4 is a diagram illustrating the graphical data flow editor of a presently preferred embodiment.

To hide the complexity of hardware from developers, a graphical editor is designed to give developers the freedom of expressing their logic using a data-flow model without having to know about the underlying hardware and programming details. FIG. 4 shows the editor window which consists of a design surface and a toolbox. Also, the toolbox has a number of graphical blocks that can be dragged and dropped on the design surface. Different blocks are interconnected to create a path where data flows from one block to another for processing. The proposed editor has the following features:

Platform-Independence: this application is developed using web technologies which makes it accessible through different desktop (Windows, Linux, OS X) and mobile operating systems (Android, iOS).
Data-Flow Driven: developers can utilize the power of data-flow modeling to express the logic of their programs.
Software Abstraction: developers don't require any programming language knowledge because this editor hides the underlying programming complexity through the use of interconnected graphical blocks.

Rules Editor and GUI Editor

The presently preferred embodiment includes an editor 18 (FIG. 1) that comprises three separate editor functions. A simple text editor allows developers to express the logic of their programs through a rule-based description. The generated rules are executed directly by the execution engine 42 on the FlexBeacon programmable block hardware.

The editor 18 also implements a data-flow editor, shown in FIG. 4. The data-flow editor comprises a design surface 46 and a toolbox 48 of data-flow blocks that a user can drag and place on the design surface as shown in FIG. 4 at 50. Once the desired data-flow blocks have been placed and arranged on the design surface the user defines flow relationships among the data-flow blocks as shown at 52 in FIG. 4. The editor 18 is then programmed to generate a rules-based language file 54 that is then uploaded into the programmable block.

Additionally, the editor 18 includes a GUI editor used to design graphical control screens used with the rules-based data-flow program. Essentially, the GUI editor allows the user to design information presentation screens and control screens that can be viewed on the end user mobile device 22 (FIG. 1). The GUI editor is similar in structure to the data-flow editor as it is also composed of a toolbox and a design surface. However, the toolbox in the GUI editor contains intelligent GUI components instead of the data-flow blocks used in the data-flow editor. Thus, developers can drag and drop GUI elements such as images, textboxes, etc. on the design surface and configure these components just like in other visual programming environments with minimal coding.

Message Broker

Figure 5:
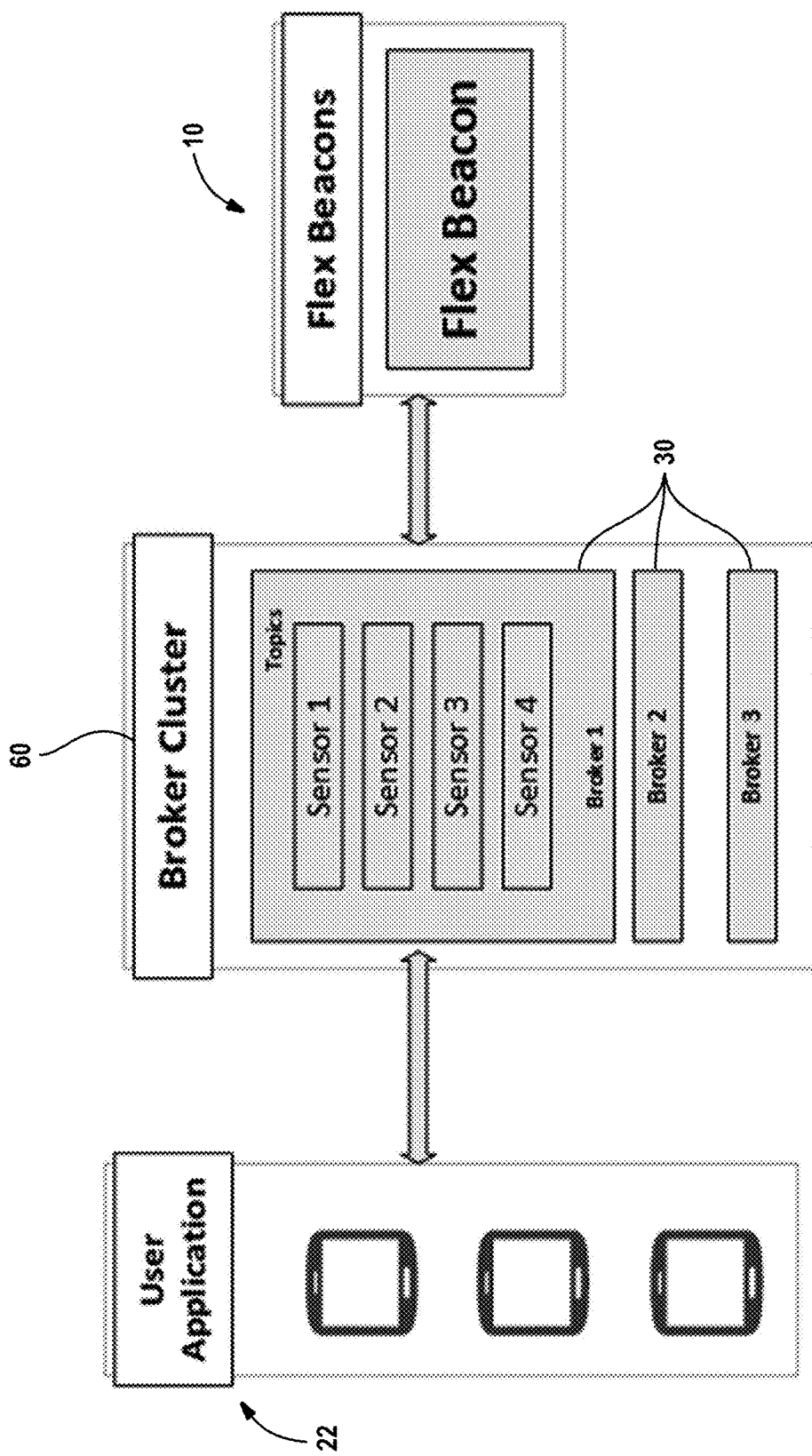
FIG. 5 is a system diagram illustrating the message broker role in the overall system.

For users outside the direct connection range of the FlexBeacon, the message broker 30 (FIG. 1) plays a vital role in delivering telemetry from the FlexBeacon nodes to interested parties subscribed over the Internet. To perform this efficiently, the message queue Telemetry Transport (MQTT) protocol is used with some modifications as detailed in our IEEE Communications Magazine paper (A. Al-Fuqaha, A. Khreishah, M. Guizani, A. Rayes, M. Mohammadi, "Toward Better Horizontal Integration Among IoT Services," IEEE Communications Magazine, Vol. 53, no. 9, pp. 72-79, September 2015). We also assume that MQTT is modified to provide the list of available sensors/actuators to the users. FIG. 5 illustrates the role of the message broker in the proposed platform. A cluster 60 of message broker servers 30 can be utilized to provide high-availability and dynamic load balancing capabilities. Note that the number of message brokers in a cluster can be dynamically scaled up and down depending on the traffic load that needs to be handled. This dynamic scaling allows customers to meet their Quality of Service (QoS) needs while minimizing the deployment costs associated with the message brokers.

As illustrated, the broker cluster 60 can be accessed both by FlexBeacon programmable blocks, as at 10 and also by user devices, such as mobile devices 22 each running a user application. Each broker 30 can mediate its own set of sensor data. As diagrammatically depicted in FIG. 5, Broker 1 has four sensors: Sensor 1, Sensor 2, Sensor 3 and Sensor 4. Depending on how the user application running on a particular user device has been written, some or all of these sensor data sources may be called upon.

Visual Rule Composition Mobile Application

Figure 6:
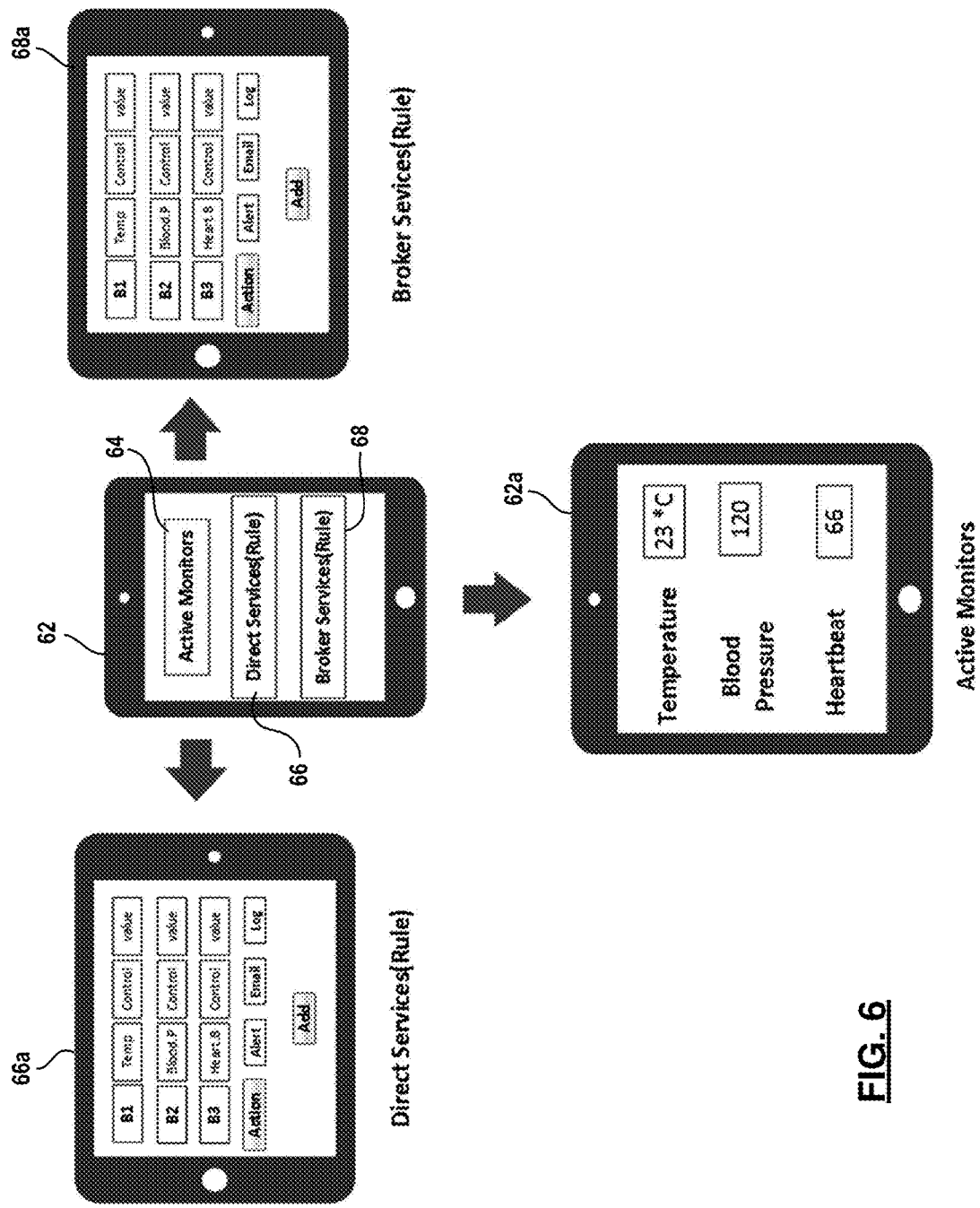
FIG. 6 illustrates the end user visual rule composition mobile application of a presently preferred embodiment.

To give users an easy to use application that allows end-users to express their telemetry monitoring, collection, and actuator control logic. This mobile application (e.g., run on a user's mobile device 22) also utilizes a graphical interface and interacts with the FlexBeacon programmable block hardware, using machine-to-machine (M2M) communications, and also with the message broker servers 30 through an Internet connection as shown in FIG. 6. As shown, the mobile application, shown at 62 comprises three components: active monitors 64, direct services (rules) 66 and broker services (rules) 68. Each of these can be programmed by manipulating the graphical elements. Thus at 66a, direct services rules can be programmed by selecting the desired graphical buttons to define how the data are defined and calculated. Similarly at 68a the broker services rules may be programmed. Finally, as at 62a, the layout of the active monitor can be programmed.

In the illustrated example of FIG. 6, the active monitor at 62a shows values for temperature, blood pressure and heartbeat. The values expressed in this active monitor view may be obtained using direct services (relying on sensor measurements made by sensors associated with a local programmable block, or perhaps sensors deployed in the user device itself. Alternatively or additionally, the active monitor view may be obtained using broker services rules (relying on sensor measurements made by sensors remote from the local programmable block or user device and communication via the broker cluster 60. In this way, the mobile application could serve as a personal health monitor, where data are collected locally, and also as a global health monitor where a patient's vital signs are collected and sent via the broker cluster 60 for analysis at a remote location.

The presently preferred mobile application has the following properties:

Platform-Independence: this application can run on any desktop OS such as Windows, Linux, OS X, and can also be used on any smart mobile device including Android and iOS based tables and smartphones.

Context-Aware: this application auto detects sensors and actuators and displays a list of existing nearby FlexBeacon devices to the user in a graphical form. Also, it is capable of retrieving remote FlexBeacon devices of interest through the message broker. FIG. 6 illustrates the overall functionality of the application.

Rule-Based: end-users can easily create rules by specifying their telemetry of interest from the list of available sensors. Users can also specify a sequence of actions to be triggered when certain conditions are met. The conditions can be described using crisp-logic, fuzzy-logic or binary classifiers.

Figure 7:
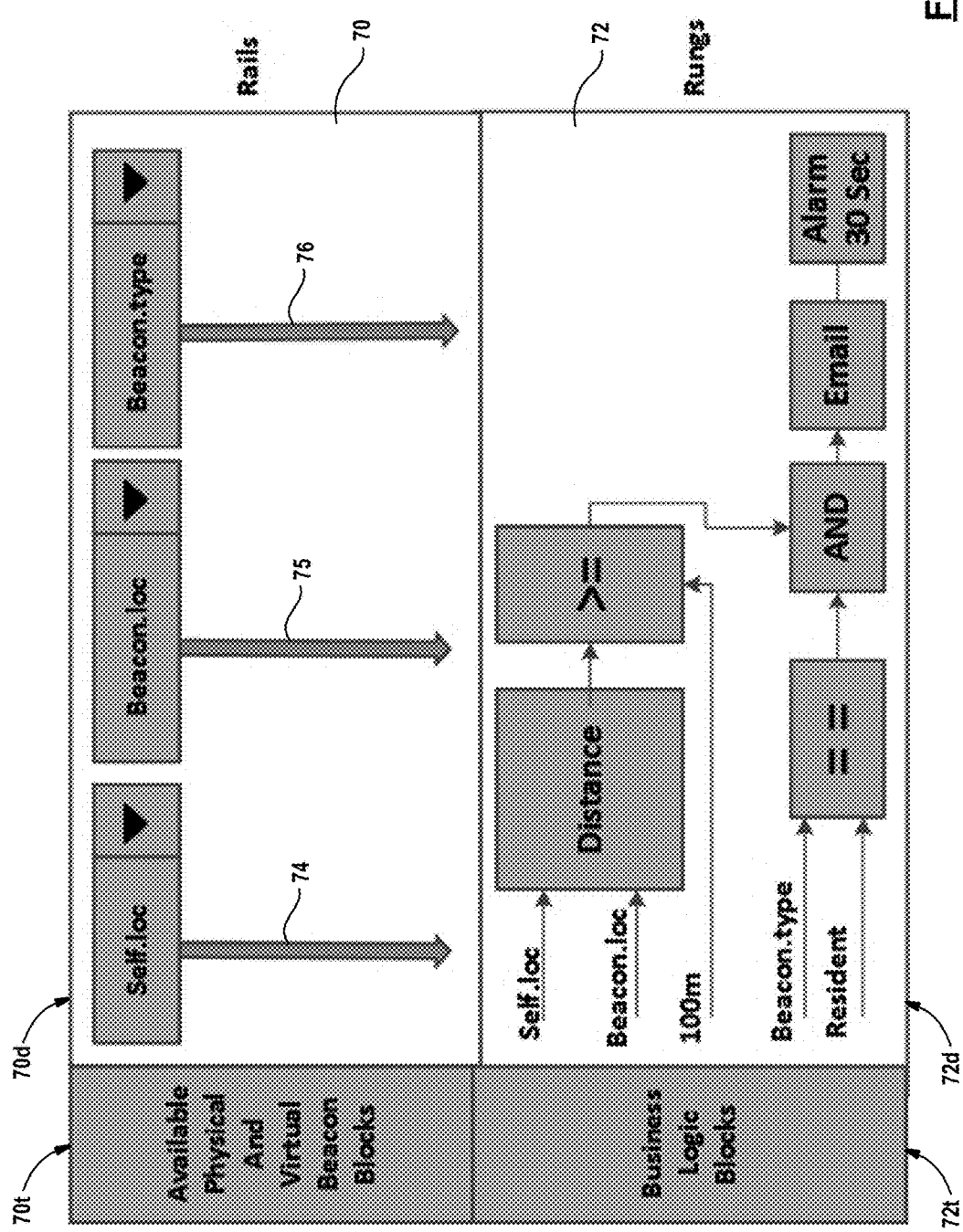
FIG. 7 is a ladder diagram showing the end-user visual rule composition mobile application implementing an exemplary use case.

Another approach that can be utilized to implement the editor 18 is to employ the visual rule composition application illustrated in FIG. 7. In this approach, the screen is divided into two regions 70 and 72, each with a toolbox 70t, 72t and a design surface 70d, 72d. The upper region 70 lists the physical and virtual beacons that are detected by the application. Here the term beacon refers to either a programmable block that exists in physical space, such as programmable blocks that are in communication with the editor, or a virtual block that exists as code executing on another processor and in communication with the editor as though the message brokers 30. Additionally, the user can drag a beacon from the toolbox and drop it on the design surface. Each beacon inserted to the design surface will have a drop-down menu where users can select a beacon property. Once a property is selected, a line will be visible (called a rail). In FIG. 7 three rails 74, 75, 76 are illustrated.

When a beacon is selected, the selected beacon property will also be shown in the lower region 72 as a horizontal line (called a rung). Next, users can manipulate the rungs with different control blocks to their logic of interest through this visual rule composer. As an example, FIG. 7 provides a visual illustration of a rule that is used in a nursing home scenario where the FlexBeacons programmable blocks are affixed to the wrists of the home residents. The rule in this example states that if the resident wanders more than 100 meters away from the facility then an email should be sent to the nurse in charge also an alarm is fired for 30 seconds. The rule is implemented by dragging a self-beacon which represents a beacon coming from the GPS-equipped Flex-Beacon device deployed on the nursing station. Therefore, this visual rule allows the FlexBeacon equipped nursing station to constantly calculate the separation distance between the residents and the nursing station and produce the requested alerts when this distance exceeds the identified threshold (100 meters in this case).

Application Program Interface (API)

For companies that need to customize the end-user application, comprehensive APIs are exposed so that developers have the flexibility to express their backend logic and user interface. These APIs are arranged into two parts: one part focuses on the services that communicate through the northbound interface 21 (FIG. 3) with the message broker, and the second focuses on services that communicate through the east/west-bound interfaces 20 (FIG. 3) with the FlexBeacon hardware.

Software

The software side of the FlexBeacon programmable block platform consists of the following components:

Graphical Web Development Suite.

FlexBeacon Execution Engine

Message Broker Program

Visual Rule Composition Mobile Application

APIs

FlexBeacon Decision Support System

Each of these components is detailed in the following sections with figures, classes, and sequence diagrams as required to illustrate the implementation details.

Graphical Web Development Suite

This graphical web development suite is a web application that has the following editors: a data-flow editor, a rule editor, and a GUI editor. These were introduced and discussed above in connection with FIG. 4. Each of the three editors has its unique features. The basic feature of the data-flow editor is the ability to design programs that run on the FlexBeacon programmable block hardware. However, programs that utilize simulation sources can entirely run on the editor itself. Also, by using URL sinks, the editor can generate simulation data and post it on a URL to message brokers. The message brokers can in turn forward the data to subscribed mobile applications. This data simulation feature provides the ability to test the system under "heavy load" scenarios (e.g., a large customer base).

The GUI editor uses intelligent controls that function as virtual beacons. This unique feature provides these user interface controls with the ability to broadcast (i.e., beacon) events. For example, a button has the ability to beacon an event when clicked. In other words, these smart controls work exactly as their physical counterpart (i.e., sensors) and can broadcast their status so that other components are updated about their status.

The rule editor has the ability to detect the virtual beacons of GUI controls and show them as a list to the developer, who can utilize the ones of interest while writing the rules.

These three editors can be used in different scenarios, such as the following:

1. Developing the FlexBeacon program: in this scenario the GUI editor is not used because the target is the Flex-Beacon hardware which has no user interface being an embedded program. Thus, the data-flow editor can be used alone to develop the data-flow portion of the program. Also, the rule editor can be used alone to develop the rules on top of an existing FlexBeacon program. Note that the data-flow and rule editors can be used jointly to customize the behavior of the FlexBeacon hardware.

2. Developing a full mobile application: all three editors can be used together to generate a mobile application. First, the GUI editor is used to design the user interface portion of the application. Second, the rule editor is used to develop rules that perform actions when certain events are triggered. Third, the data-flow editor is used to develop the logic behind the mobile application. Finally, the web development suite is used to generate the mobile application for a given target OS based on the result files generated by the three editors. In fact, this way, developers have the ability to generate a mobile application without having to access the platform's APIs manually and without the need to learn any programming language. Besides, developers can express their needs without having to depend on the visual rule composition mobile application discussed earlier.

Figure 16:
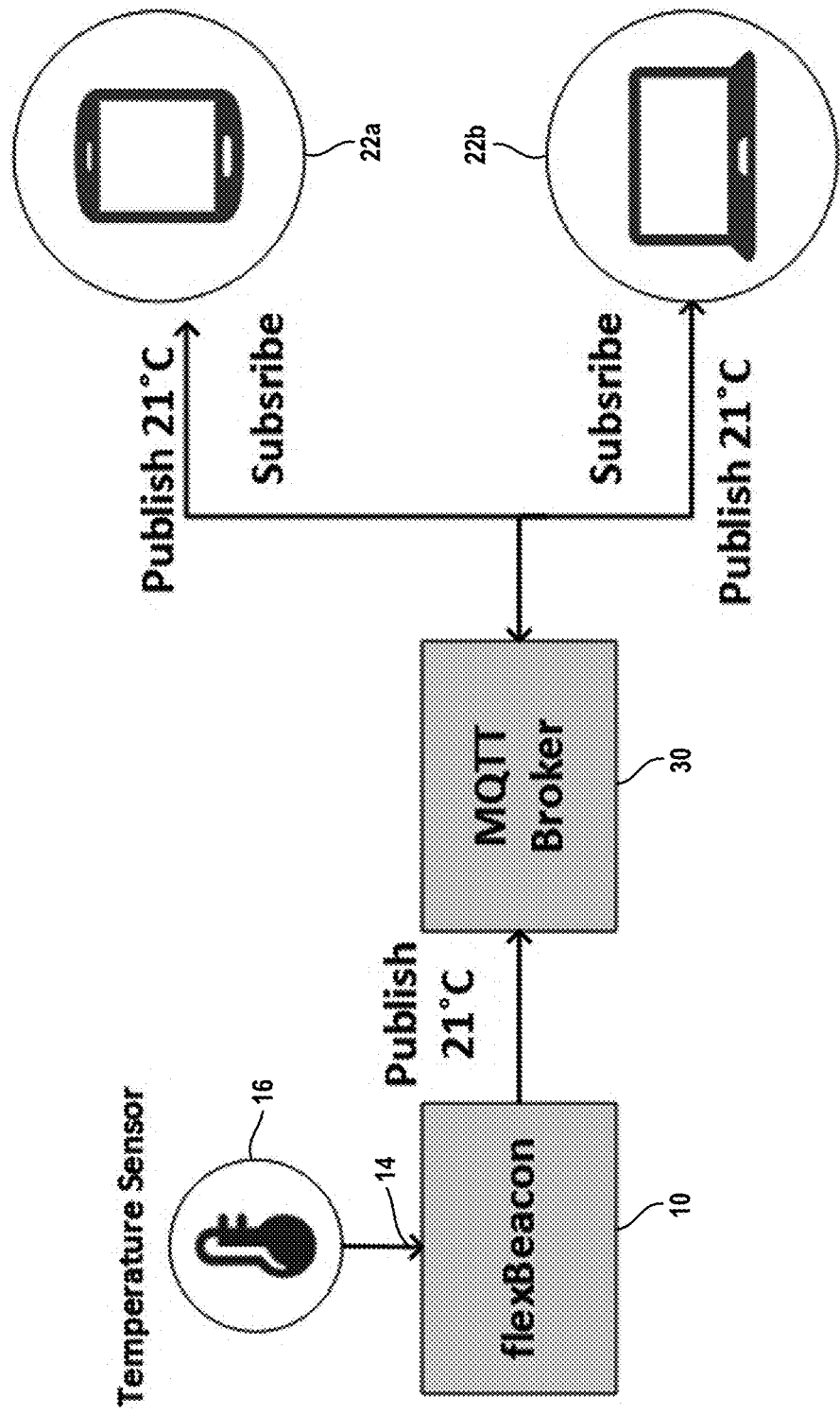
FIG. 16 is a data flow diagram illustrating the MQTT connection flow in an exemplary temperature sensing application.

3. Developing a training mobile application: the three editors can be used to generate a mobile application that does not interact with the FlexBeacon hardware. In other words, the generated application depends on intelligent GUI controls and rules to interact with the user for training purposes. For example, a mobile application for aviation training can be developed by using these smart controls with different images of buttons and switches for airplane panels and design rules for interaction with each of these controls in order to build an aviation training scenario as shown in FIG. 16. The data-flow editor is used to design the overall logic of the program and certainly no physical sources or sinks are used in this case.

As previously illustrated in connection with FIG. 2, the main window of the web application has three tabs. Each tab contains one of the three editors. The first tab contains the data-flow editor which developers use to design the program that will be executed on the FlexBeacon hardware, a simulation program executed in the editor itself, or the logic of the custom mobile application. Being data-flow driven, the editor simplifies the development process of the low-level program using graphical draggable blocks.

Data Flow Editor

The data flow editor consists of two main components: the design surface and the toolbox and provides the following functions:

Create new project
Save the current project
Create a new block
Generate the data-flow XML/JSON file
List available devices (FlexBeacons nodes around the current location)
Flash the generated XML/JSON file into the FlexBeacon node given the node's name or IP address.

The toolbox has a number of blocks which can be classified according to their functionality into ten categories as follows:

Sources: provide data from three main sources, namely (1) physical ports that provide data received from one of the supported ports; (2) backhaul sources that provide data from WebServices or URLs over the Internet; and (3) simulation sources that generate data according to a prescribed method.

Variables and Constants: used to store variable and fixed data.

Counters: increment or decrement by a constant value each time an input is received.

Mathematical Operations: implement common mathematical operations which include add, subtract, multiply, divide, min, and max.

Control Operations: represent logical operations which include if, split, route, delay, and loop.

Boolean Operations: implement common logical operations which include and, or, not, and+or.

Convertors: implement common type conversion operation (e.g., convert string to integer, etc.).

Sinks: implement blocks that terminate data. There are two different types of sinks, namely (1) direct connection sinks that transmit the incoming data through one of the directly connected M2M modems (e.g., BLE, WI-FI Direct, and LTE-Direct); and (2) backhaul connection sinks that transmit the incoming data over the Internet to a specific WebService, URL, or a message broker.

Communication Services: these blocks provides data logging (e.g., on a local flash), email, tactile, audio, and visual notification services on the local FlexBeacon node or through the backhaul Internet connection.

New Block: this represents a developer defined block that can be added and configured as needed.

Figure 8:
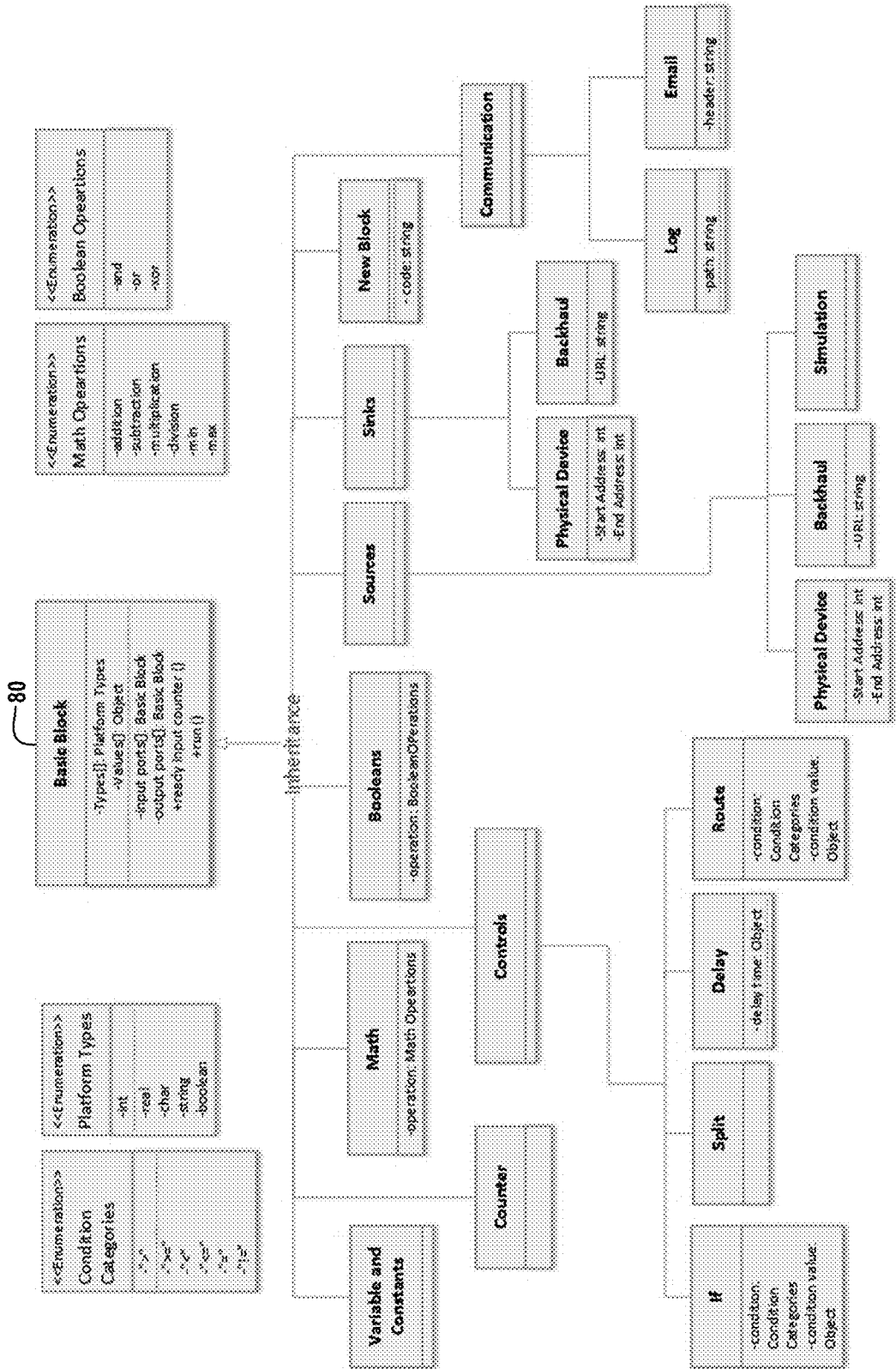
FIG. 8 is a class inheritance diagram showing the hierarchy of blocks, useful in understanding how to program the processor of the programmable block.

Referring to FIG. 8, these ten categories of functionality have been represented in an object-oriented design structure from which the basic block 80 (discussed below) inherits.

Each block is associated with an icon that can be dragged from the toolbox and dropped onto the design surface. Some of these blocks have one or more input ports which are used to supply the block with its input value(s). Also, some blocks may have one or more output ports used to send the block's values to other blocks down the data-flow pipeline. Input and output ports are represented as filled circles on the edges of the block icons and developers can drag a line from one of these circles on one block to another circle on another block which creates a connection to stream data from the first block to the second.

After finishing the design, developers can save their work and compile it to convert the graphical blocks to an XML/JSON structure and have it ready to be flashed on a Flex-Beacon node.

To understand how design blocks are represented and how they work, each block is represented by a class as shown in FIG. 8 which shows the inheritance hierarchy of some supported blocks.

Referring to FIG. 8, the basic block 80 defines the root class in the hierarchy from which all blocks inherit. All blocks share the following properties:

1. Types: an array of types stored in this block. Each element is an enumeration of the five supported types by the platform as listed below:

a. int: an integer with four bytes in size.
b. real: a floating point number with eight bytes of size.

c. boolean: a one byte variable that can have one of two values, either true of false.
d. char: a one-byte character.
e. string: a collection of characters variables that has a maximum of 256 characters.

2. Values: since each block can store its value which is of a specific type, the values member variable is defined as an array of Object. By doing so, each element of the values array can be initialized later as one of the following classes to reflect the required type:
   a. Integer: to reflect an int type.
   b. Double: to reflect a real type.
   c. Character: to reflect a char type.
   d. String: to reflect a string type.
3. Input Ports: an array of references to the blocks' objects connected to this block to provide input data.
4. Output Ports: an array of references to the blocks' objects connected to this block to provide output data.

The basic block also provides the following methods:
1. readyInputCounter( ): this method is used to synchronize multiple input ports to one block. Basically, the method maintains a counter that initialized to zero and whenever one input is ready from one of the input blocks, that block calls this function which increments the counter by one then checks to see if the counter value equals the number of ports and if so then this method calls the run( ) method since all inputs are ready.
2. run( ): this method contains the business logic of the block which is performed on the input values and the result is sent to the output ports.

Figure 9:
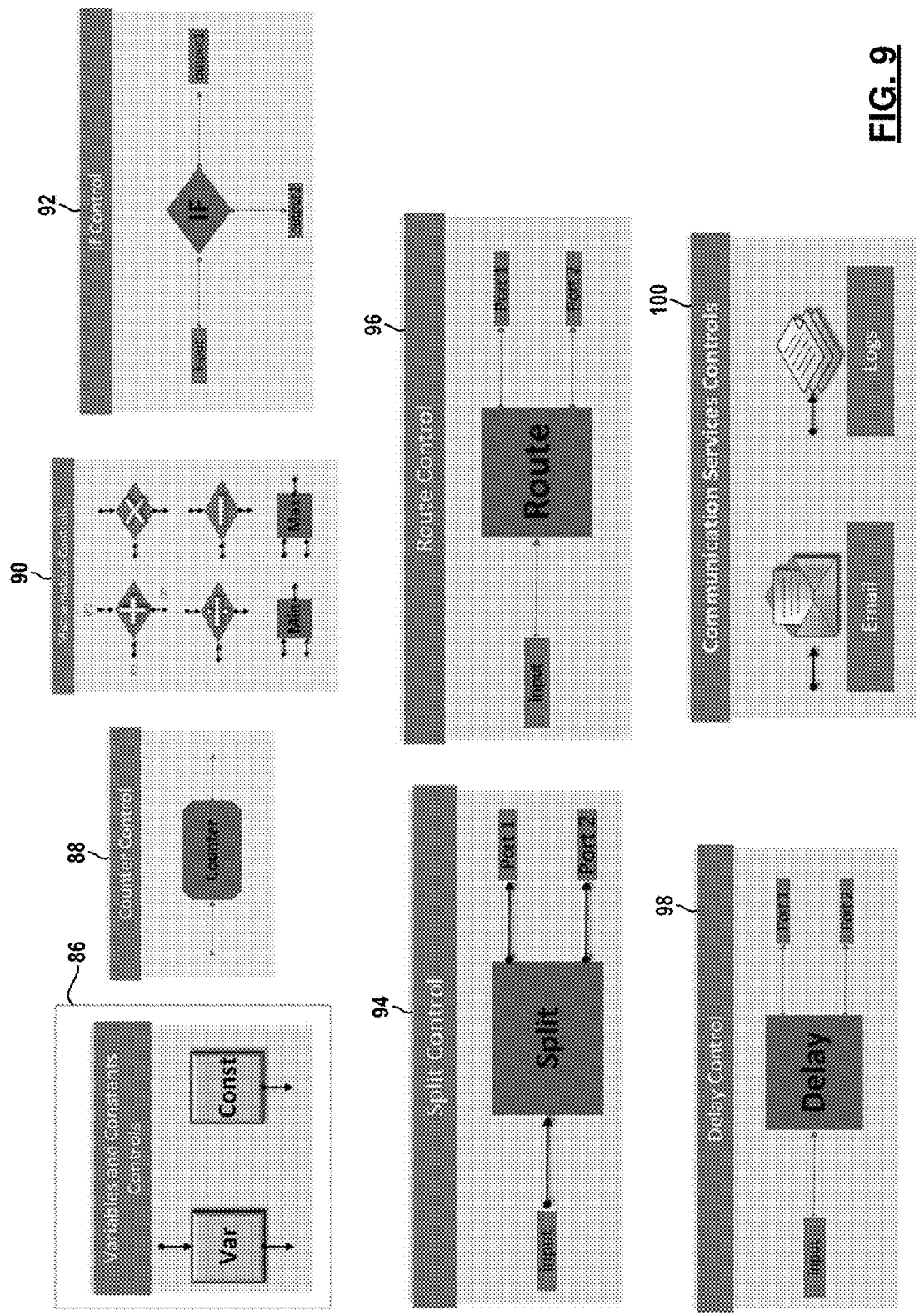
FIG. 9 illustrates a toolbox of graphical components used by the visual editor to create different user-programmed rules-based applications.

In the presently preferred embodiment the editor provides the developer with a toolbox of blocks, such as those shown in FIG. 9. Shown at 86, the variables and constants blocks are used to store values. Specifically, the variable block stores a value of one of the supported types by the platform. Variables have one input port that can be used to receive data from another block and forward it to one or more output ports. The constant bock stores a fixed value that cannot be changed. This block has no input ports, but multiple output ports and can be used to continuously supply the system with a predefined value.

Shown at 88, the counter block represents a special type of variable that stores an integer value initialized to certain value by the constructor and whenever a new input is received by this block, the internal value is incremented by a predefined constant. This block is useful for tracking the number of inputs from another block. The block has one input port and one or more output ports.

The mathematical block 90 is configurable to perform one of six mathematical operations: add, subtract, multiply, divide, min, and max. It has two or more input ports and one or more output ports. The mathematical operations are applied on the values arriving on the input ports and the result is sent to all output ports.

The Boolean block (not shown) can be configured to do one of the basic Boolean operations: and, or, not, and xor. It has two or more input ports and one or more output ports. The Boolean operations are applied on the values received on the input ports and the result is sent to all output ports.

The control block 92 can perform a flow control operation such as the IF operation. As illustrated, the IF operation block has one input port and two output ports. The IF block tests a condition based on the input value and if the result is true then a Boolean true is sent through output port one to activate the block connected to it; otherwise, if the result is a Boolean false then a Boolean false is sent through output port two to activate the block connected to it.

The split block 94 has one input port and two or more output ports. This block forwards whatever value it receives from the input port to the output ports.

The route block 96 implements a mixture between the IF block and the split block. It forwards the incoming value based on a routing condition. If the routing condition is true, then the value is sent to output port one; otherwise, it is sent to output port two.

The delay block 98 delays the output for a specific number of milliseconds before forwarding it to the output port. It has one input port and one or more output ports.

Source blocks (not shown) have no input ports but one or more output ports. There are three types of source blocks as follows:
1. Physical device blocks: these blocks can be configured by setting the required memory mapped IO parameters (i.e., base and offset addresses) to read data from a specific physical device attached to the FlexBeacon board. The block then sends the data to other blocks connected to its output ports.
2. Simulation blocks: these blocks represent virtual devices (e.g., sensors). These blocks generate data and send it to the output ports.
3. Backhaul blocks: these blocks read data from a specific WebService, URL, or a message broker and send it to the output ports.

Sink blocks (not shown) are similar to their sources counterpart but are used to terminate the received data. They have no output ports but one input port. There are two blocks of this type:
1. M2M connection blocks: these blocks send data received on their input port to one of the M2M modems.
2. Backhaul blocks: these blocks send data received on their input port to a specific WebService, URL, or a message broker.

Convertors Blocks (not shown) have one input port and one or more output ports. The main function of this block is to convert from one type to another. There are twenty conversion cases as shown in Table I.

TABLE I

Type Conversions

| Source Type | Destination Type | Description |
| --- | --- | --- |
| int | real | Convert integer number to real number |
| int | char | Convert integer number less than 255 to character according to ASCII code. |
| int | string | Convert integer number to string. For example, 34 becomes "34" |
| int | boolean | Convert any positive non zero integer number to true while negative and zero become false |
| real | Int | Convert real number to integer number by rounding integers |
| real | char | Convert real number less than 255 to character by rounding the number then convert using ASCII code |
| real | string | Convert real number to string. For example, 35.89 becomes "35.89" |
| real | boolean | Like integer to boolean |
| char | Int | Convert character to integer using ASCII code |
| char | real | Convert character to real using ASCII code |
| char | string | Convert character to string. For example, 'A' becomes "A" |
| char | boolean | Convert the character 'T' or 't' to true and 'f' or 'F' to false. Otherwise, an error is produced |
| string | Int | If all characters in the string are digits then conversion is performed; Otherwise, an error is produced |

TABLE I-continued

Type Conversions

| Source Type | Destination Type | Description |
|---|---|---|
| string | real | If all characters in the string are digits and one of them is the character '.' then conversion is performed; Otherwise, an error is produced |
| string | char | If the string is one character then conversion is performed; Otherwise, an error is produced |
| string | boolean | If the string is only one character (i.e., 't' or 'T') or the string is one word which is any variation of small and capital letters of the word 'TRUE' then the result is true. On the other hand, if the string is only one character (i.e., 'f' or 'F') or the string is one word which is any variation of small and capital letters of the word 'FALSE' then the result is false. Otherwise, an error is produced |
| boolean | Int | True is converted to 1 and false is converted to 0 |
| boolean | real | True is converted to 1.0 and false is converted to 0.0 |
| boolean | char | True is converted to 'T' and false is converted to 'F' |
| boolean | string | True is converted to "TRUE" and false is converted to "FALSE" |

Communication services blocks 100 implement the log and email functions. They have only one input port. The value received from the input port is either logged to the main storage device (e.g., flash) or sent via email.

Rules Editor

The rules editor is implemented as a text based editor that allows developers to compose rules. Preferably the rules editor includes an auto-complete feature that when the developer starts writing a word a list of suggested commands will be shown (i.e., intelliSense). Rules have the following structure:

If condition then action

The antecedent "Condition" part is applied on the status of the received beacon broadcasts and the consequent "action" part represents the sequence of steps to execute when the antecedent is true. Thus, beacon source must be specified which can include a physical device, a simulation control, or a GUI control. In fact, GUI controls are considered virtual beaconing controls in the rules editor since they have the capability to generate "virtual" beacon events such as a mouse click. Next, the developer needs to specify the beacon status of interest. For example, when the temperature reported by the sensor deployed in the west quadrant is greater than 80. Finally, the developer needs to specify the action which is the sequence of steps to be applied whenever the beacon status of interest is triggered. For example, trigger a sound alarm.

The rules are evaluated and executed in software or hardware through the rule execution engine that is based on a variation of the RETE algorithm. It should be emphasized here that the FlexBeacon hardware provides a hardware implementation of the rule execution engine realized on an integrated FPGA to minimize the triggering latency of the rules. This feature might be important for delay sensitive application as in the case of Vehicle-to-Vehicle (V2V) communications or V2X (e.g., vehicle to bike or vehicle to pedestrian, etc.) in general.

GUI Editor

The GUI editor is a simple editor that is based on intelligent controls and heavily relies on the use of "smart images." With appropriate smart images, developers and even end-users can design sophisticated user interfaces. The GUI provides two types of controls, namely end-user intelligent controls and developers' controls.

End-Users' Intelligent Controls: these controls are designed for end-users who have no knowledge of any programming language. There controls are broadly classified into three categories:

Visual Controls
Audio Controls
Tactile Controls

Visual controls include placeholder controls which look like rectangles with border lines and an empty space in the middle. Also, placeholder controls are used for positioning other visual controls like image controls without the need of any coordinate system or other layout methods as in the case of Java. Thus, placeholder controls serve as a location on the design surface of the application where images can be shown. Therefore, end-users can drag and drop placeholder controls then move them around the design surface and resize them as desired then name them by specifying a name for each placeholder which represents an ID. Image controls represent picture files, so the end-users drag and drop image controls on the design surface and link them to a specific placeholder. Each image control has a name (ID) and a path that stores the path of the corresponding picture file. To solve the issue of image size being different from the placeholder size, auto-resize property is added to the placeholder so that if this property is on, then placeholder controls will resize to fit the image. Otherwise, if this property is off then the image control will be resized to fit the placeholder control. As for audio controls, they can be dragged and dropped on the design surface but they are invisible in the run-time phase. Like visual controls, audio controls have two properties, name and file path.

After the end-users finish their design, they can switch to the rule editor and write simple rules that switch between image controls on the same placeholder control in response to specific events. For example, in the aviation example discussed earlier, each button picture has a placeholder control on the design surface and there are two or more image controls for that placeholder control that represent the button picture in different positions.

Figure 10:
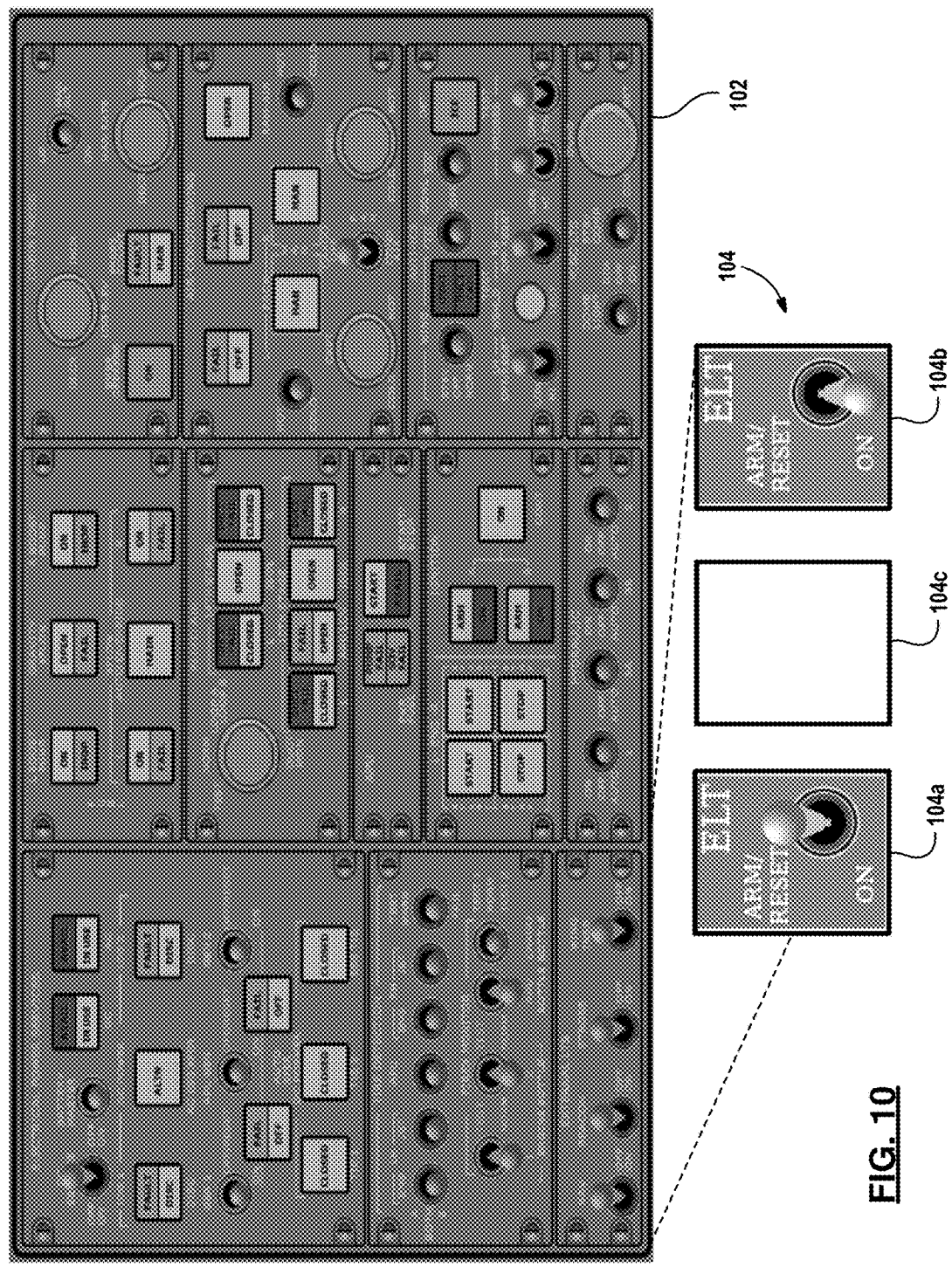
FIG. 10 is an exemplary use case example showing how the graphical editor is used to create an operable user interface, in this case an aircraft flight simulator.

To illustrate how the GUI editor might be used, refer now to FIG. 10, which shows an exemplary aviation training application screen at 102 and how the individual graphical user interface switches would be designed using the GUI editor. Thus as shown at 104, an exemplary external lights switch (ELT) is shown at 104*a* where the switch is flipped to the Arm/Reset state and at 104*b* where the switch is flipped to the On state. When the aviation training application is used, either switch display 104*a* or 104*b* will be shown, depending on the logical state of the external lights switch. A third placeholder control 104*c* has also been illustrated. The placeholder control can be used to reserve a space in the overall graphical design for a future control yet to be determined, or to simply organize the overall layout.

To get a better understanding of how these simple yet intelligent controls work, consider the scenario where the end-user names the placeholder control "p1" and the first image control "up" and the second image control "down." Next, after the end-user finishes creating the user interface, developers can use the rule editor to specify that when a click beacon is produced by the placeholder control then the image controls are swapped as follows:

If beacon.source=p1 and p1.imageCtrl=up then p1.imageCtrl=down if beacon.source=p1 and p1.imageCtrl=down then p1.imageCtrl=up This creates a simple user interface that solely depends on pictures and rules without the need for normal visual controls and programming languages.

Developers' Controls:

These controls represent the normal controls found in any visual programming language including textboxes, buttons, etc. However, these are also smart controls with the ability of emitting beacons which normal controls in different programming languages do not provide.

FlexBeacon Execution Engine

The software execution engine program may be implemented in Java and stored into non-transitory memory on the FlexBeacon programmable block hardware board. The execution engine is responsible for providing the following functionality:

Interpret and execute the data-flow XML/JSON file.
Interpret and execute the rule XML/JSON file.
Read data from sources which include physical ports and backhaul connections.
Write data to sinks which include physical ports and backhaul connections.
Communicate with the message broker.

Figure 11:
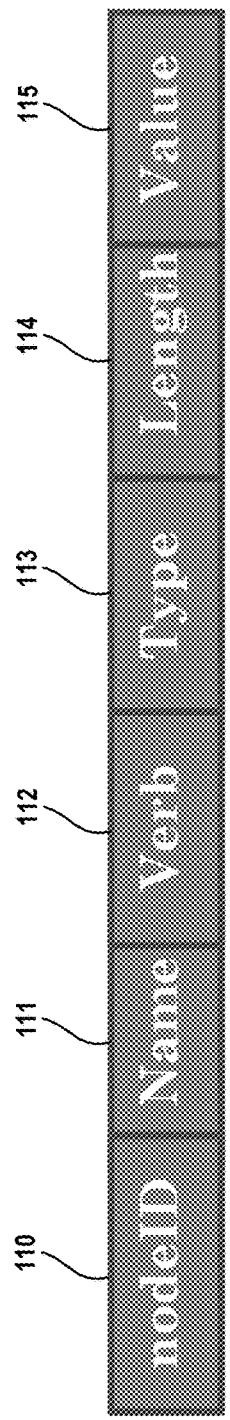
FIG. 11 is a data structure diagram illustrating a presently preferred message structure used by the programmable blocks to intercommunicate.

The basic unit of communication between this program which represents the hardware (FlexBeacon) and the mobile application or the message broker is shown in FIG. 11. Referring to FIG. 11, the message format utilized by the execution engine consists of the following five sections:

a. nodeID shown at 110: This field represents a unique number that identifies a flexBeacon hardware node.

b. Name shown at 111: This field comprises a string that represents the device service name such as "temperature," "distance," "location," etc. Also, the name can be used for other purposes including the implementation of security primitives.

c. Verb shown at 112: This field represents an action which is sent to actuators.

d. Type shown at 113: This field identifies the data type of the value field which is one of the platform supported types.

e. Length shown at 114: This field identifies length of the value field in type units.

f. Value shown at 115: this field contains the data being transferred.

The FlexBeacon's execution engine starts by interpreting the XML/JSON data-flow file to extract the blocks' properties and relations. Also, classes representing these blocks are available in the program and in case a new block is created then developers need to flash the new class of that block on the flexBeacon hardware. Therefore, the XML/JSON file is used to guide the execution engine by identifying the number and types of blocks needed then instantiate objects of the classes that represent these blocks and configure them according to the properties in the blocks. Next, after instantiating all required objects, the execution engine calls the run method of the first block (object) which reads data from some source and update the input status for the next objects and the process continues. While the objects are being executed, the rule XML/JSON file is fed to a software or hardware engine that provides an implementation of a variation of the RETE algorithm.

Data Flow XML Structure

The data-flow graphical blocks are transformed into an XML/JSON file based on Table II which illustrates the XML structure of each block:

TABLE II

| Block Name | XML Structure |
|---|---|
| Variable | <variable type=t value=v ip1=bid op1=bid></variable> |
| Constant | <constant type=t value=v op1=bid></constant> |
| Counter | <counter type=t value=v ip1=bid op1=bid></counter> |
| Mathematical | <math op=o type=t value=v ip1=bid ... ipN=bid op1=bid ... opN=bid></math> |
| Boolean | <bool op=o type=t value=v ip1=bid ... ipN=bid op1=bid ... opN=bid></bool> |
| Control-IF | <if type=t value=v cvalue=cv cop=co ip1=bid op1=bid op2=bid></if> |
| Control-Split | <split type=t value=v cvalue=cv cop=co ip1=bid op1=bid ... opN=bid></split> |
| Control-Route | <route type=t value=v cvalue=cv cop=co ip1=bid op1=bid ... opN=bid></route> |
| Control-Delay | <delay type=t value=v delay=time ip1=bid op1=bid ... opN=bid></delay> |
| Source | <source cat=c startAddr=sa endAddr=ea type=t value=v op1=bid ... opN=bid></source> |
| Sink | <sink cat=c startAddr=sa endAddr=ea type=t value=v ip1=bid></sink> |
| Converter | <convertor src=st des=dt type=t value=v ip1=bid op1=bid ... opN=bid></convertor> |
| Communication-Log | <log path=p type=t value=v ip1=bid></log> |
| Communication-Email | <email header=h type=t value=v ip1=bid></email> |
| New Block | <blockName type=t value=v ip1=bid ... ipN=bid op1=bid ... opN=bid code=cd></blockName> |

To be able to execute any XML/JSON file that contains commands to read and write from/to sources and sink, a set of functions are provided on the FlexBeacon execution engine for communication with the hardware ports as shown in the code declaration excerpt below.

FlexBeacon Hardware Functions:
```
public void writeGPIO(int startAddr, int endAddr, byte[ ]
buffer) public byte[ ] readGPIO(int startAddr, int endAddr)
public void writeI2C(int startAddr, int endAddr, byte[ ]
buffer) public byte[ ] readI2C(int startAddr, int endAddr)
public void writeSSI(int startAddr, int endAddr, byte[ ]
buffer) public byte[ ] readSPI(int startAddr, int endAddr)
public void writeGPIB(int startAddr, int endAddr, byte[ ]
buffer) public byte[ ] readGPIB(int startAddr, int endAddr)
public void writeUSB(int startAddr, int endAddr, byte[ ]
buffer) public byte[ ] readUSB(int startAddr, int endAddr)
public void writeRS232(int startAddr, int endAddr, byte[ ]
buffer)
    public byte[ ] readRS232 (int startAddr, int endAddr)
```
Also, the code declaration excerpt below shows the functions required for providing communication over the Internet with a specific WebService or URL:

```
public void writeToURL(String url, String msg)
public String readURL(String url)
```

M2M Communication

Figure 12:
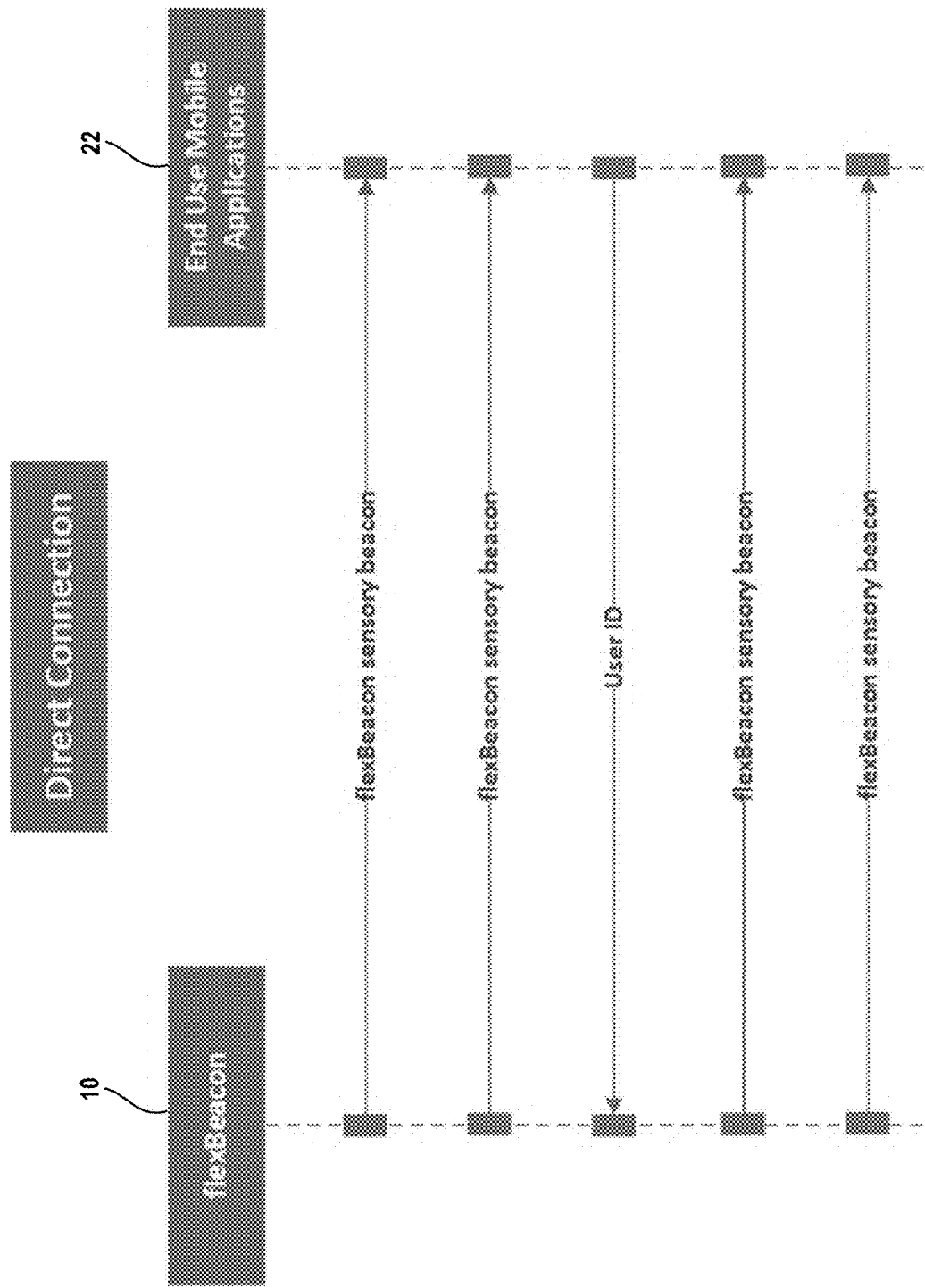
FIG. 12 is a sequence diagram illustrating how direct communication is performed between a programmable block and a user mobile device.

In the presently preferred embodiment, some machine-to-machine (M2M) communications can be sent directly between communicating entities, without intervention of a message broker 30. To have a better sense of the M2M communications which do not require the intervention of the message broker, consider the following two cases:

1. Direct communication between the FlexBeacon programmable block 10 and the mobile application running on a mobile device 22 as shown in FIG. 12. In this case, on one side, the FlexBeacon keeps sending telemetry beacons while listening for incoming beacons. On the other side, the mobile application receives beacons and uses them according to the generated rules. In addition, the mobile application sends beacons to the FlexBeacon. For example in FIG. 12, the mobile application sends the user ID which gives the FlexBeacon the ability of being user-aware. Furthermore, if different FlexBeacons are scattered around a building, then a smart building can detect, track, and count users and perform active adjustments to different building services based on the available users at that time.

Figure 13:
FIG. 13 is a sequence diagram illustrating how direct communication is performed between two programmable blocks, effecting machine-to-machine communications.

2. Direct communication between two FlexBeacon programmable blocks 10a, 10b as shown in FIG. 13. This is an example of a M2M interaction. In this case, the FlexBeacon programmable blocks directly share with each other their own telemetry.

Message Broker Program

Figure 14:
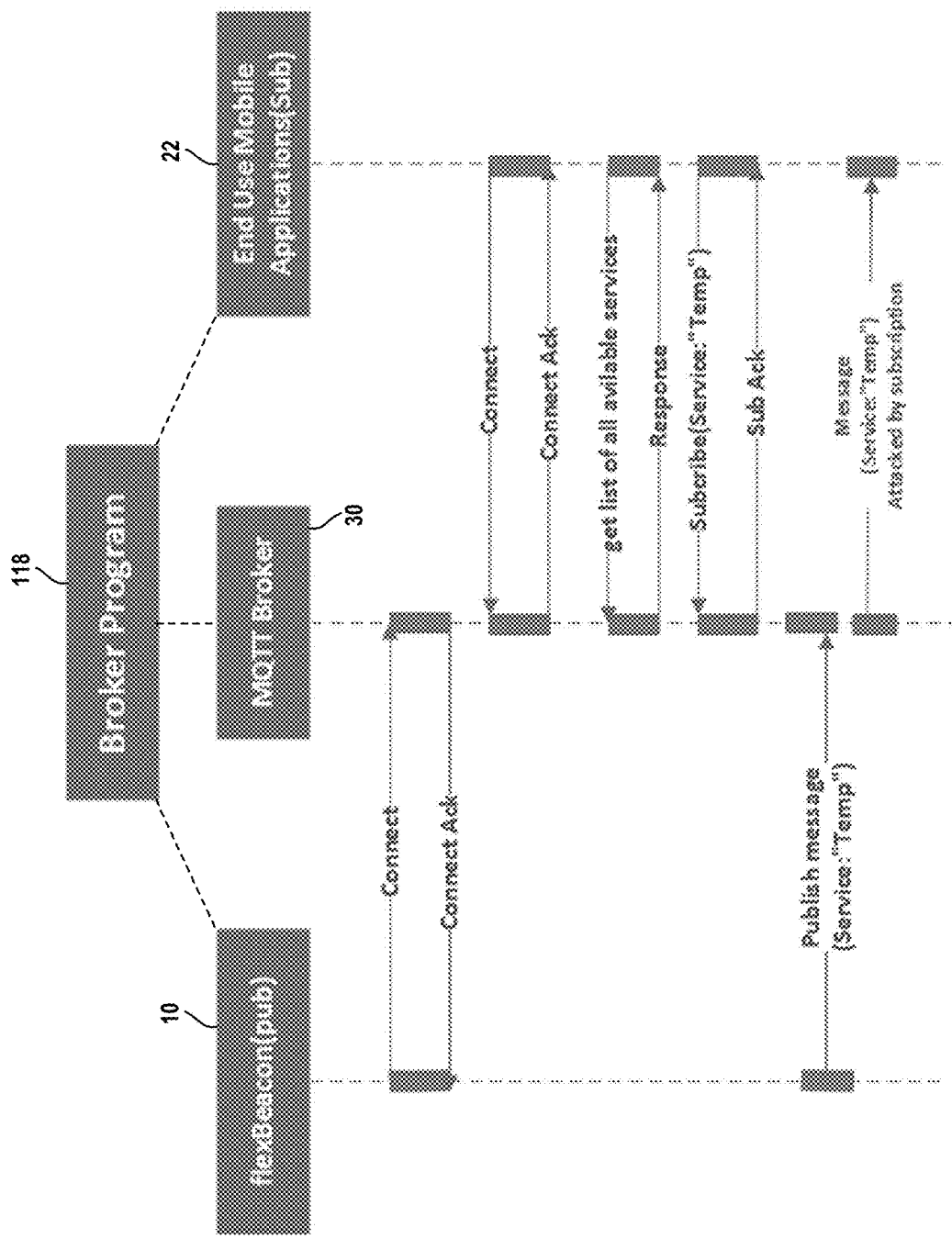
FIG. 14 is a sequence diagram illustrating how communication is accomplished through a message broker.

The message brokers 30 (FIG. 2) store within their non-transitory memory and execute using their processor(s) a message broker program that plays a role in routing data where the end-user mobile devices are out of proximity and require remote access to the telemetry of a given FlexBeacon programmable block. This message broker program, shown at 118 in FIG. 14, preferably utilizes the message queue telemetry transport (MQTT) protocol, and specifically the MQTT publish/subscribe model. FIG. 14 shows the sequence of interactions between the message broker 30 from one side and the FlexBeacon programmable block 10 and the end-user mobile application (running on a mobile device 22) on the other side.

Figure 15:
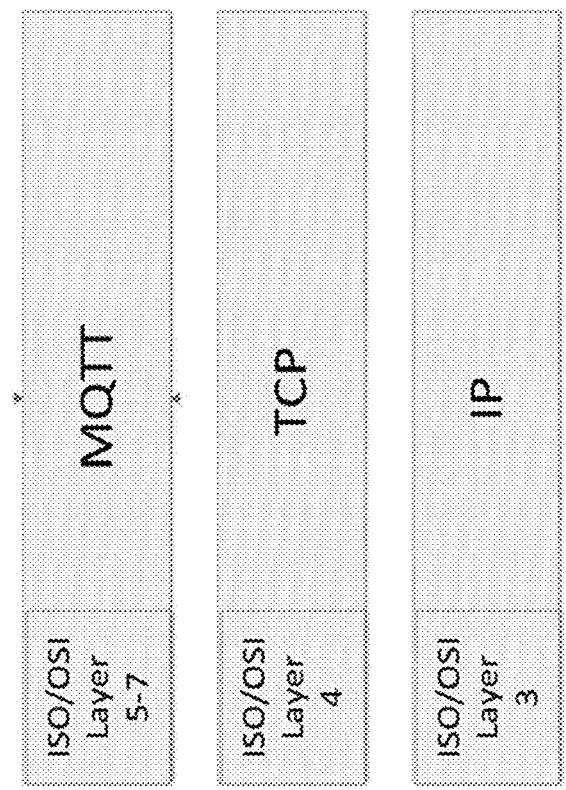
FIG. 15 is a communication system layer diagram illustrating where presently preferred MQTT layer is positioned relative to the TCP/IP layers.

The MQTT is a lightweight messaging protocol adapted for use on top of the TCP/IP protocol. While MQTT is presently preferred, other protocols may be utilized if desired. FIG. 15 shows how the MQTT client runs on top of the TCP/IP protocol. The MQTT client is utilized by The FlexBeacon programmable blocks 10 and applications running on the mobile devices 22 both operate as an MQTT client. The message broker 30 operates as an MQTT broker. The broker is primarily responsible for receiving messages from the FlexBeacon programmable block hardware, filtering them according to services (topics), deciding what other client devices are interested in it and then sending the message to all interested clients (e.g., end-user mobile devices).

The MQTT connection steps are shown in FIG. 16. In this case an exemplary use case is illustrated where a FlexBeacon programmable block 10 has a temperature sensor 16 attached to its port 14 and supplies temperature information through the MQTT broker 30 to two mobile devices 22a, 22b. While mobile devices are featured in the present disclosure, it will be understood that immobile devices, such as fixed computer workstations, can take on the role of an MQTT client and thus provide much of the same functionality as a true mobile device.

As illustrated in FIG. 16, the MQTT connection itself is always between one end-user mobile application (running on a mobile device or fixed computer) and the message broker; or between a FlexBeacon node and the message broker. The connection is initiated through a FlexBeacon (MQTT client) sending a CONNECT message to the message broker. The message broker responds with a CONNECT ACK and a status code. The end-user mobile device also connects to the message broker in a similar way. Once the connection is established, the message broker keeps it open as long as the client doesn't send a disconnect command or it loses the connection.

From the mobile APIs, the end-user application calls a method to get all the services available to the message broker. These services are listed in the message broker rule screen of the application. From the application itself, the user selects the services they are interested in and proceeds to add a rule. After performing the add operation on screen for that service, an actual subscription message is sent from the application to the message broker. After the subscription to a particular service, the application gets all messages/data published under that service and is visualized in the active monitors screen.

Visual Rule Composition Mobile Application

As discussed above, the presently preferred embodiment utilizes editors that allow the developer or user to create programs by manipulating graphical icons on the editor's display screen. This visual or graphical programming capability may be implemented using the Apache Cordova technology to be platform-independent. The editor program utilizes the platform APIs for the following tasks:

a. Detects or discovers nearby FlexBeacons and display the schema of these beacons to the users.

b. Communicates with the message broker to get all topics which represent the services available from sensors and actuators to display them to the users.

c. Allows users to create rules for a specific beacon (a single sensor or actuator) or a rule based on many beacons (multiple sensors or actuators).

d. Fire events that contain the rules' actions when the rules' antecedents are true.

The application continuously listens to FlexBeacon transmissions using one of the connected M2M modems. Next, whenever beacons are detected, the application extracts the names of the available services from these beacon messages and adds it to the list of direct (rules) screen. Also, the application communicate with the broker and request a list of available services (topics), retrieve them and extract the name field to display a list for the user on the broker (rules) screen. Next, the user can select any beacon from the list and then selects a conditional operation, a value to be used with that operation, and an action to fire when the condition if fulfilled. Once the user creates a new rule, the application feeds the rule to an implementation of the Rete pattern matching algorithm. This algorithm continuously reads the incoming beacons and applies the rules' conditions on these values. Whenever a condition yields a true result, the corresponding action of the rule is activated.

Software Development Kit (SDK) and Use of APIs

So far, we described two options that are available for mobile application development; namely, the visual rule composition mobile application and the graphical development suite. However, sometimes companies and developers may need more freedom to integrate the FlexBeacons with their existing or legacy infrastructure. In such settings, the platform's SDK can be utilized. This SDK has two main components: the FlexBeacon SDK and the message broker SDK.

FlexBeacon SDK

The FlexBeacon SDK provides the flexibility to implement the communication between the FlexBeacon hardware and the end-user mobile application. Furthermore, this SDK can be used to develop complete FlexBeacon and mobile application programs.

The first part of the SDK is the basic SDK class which has three methods for enabling, disabling the SDK and error handling as shown in the following code excerpt:

```
private final flexBeaconSDKCallback flexBeaconCallback =
new flexBeaconSDKCallback( ) {
    // The flexBeacon SDK is ready to start listen to beacons
    @Override
    public void onEnabled( ) {
        // Do something after enabling the SDK
    }
    // The flexBeacon SDK is suspended
    @Override
    public void onSuspended( ) {
        //Do something after stopping the SDK
    }
    // An error occur in the flexBeacon SDK while enabling it
    @Override
    public void onError(ErrorCode errorCode) {
        // Do something when error occur
    }
};
```

The next part is the discovery listener class shown in the code excerpt, FlexBeacon discovery listener below. This discovery mechanism allows developers to register listeners and provides three event methods:

a. onflexBeaconDiscovered: this is fired when a new beacon is detected by the SDK, so developers can put their code in this method to handle new beacons or new FlexBeacon devices.

b. onflexBeaconLost: this is fired when an existing beacon is lost which means that the device that broadcasts this beacon is off.

c. onflexBeaconStateChanged: this is fired when a device sends a beacon using a different M2M technology than the one used in earlier beacons. In other words, if a device used to send beacons using WIFI-Direct then after sometime starts sending beacons using BLE instead, this method is invoked.

```
private final flexBeaconDiscoveryListener fdl = new
flexBeaconDiscoveryListener( ) {
    @Override
    public void onflexBeaconStateChanged (final int state) {
    }
    @Override
    public void onflexBeaconStateChanged (final int state) {
    }
    @Override
    public void onflexBeaconDiscovered (final long nodeID, final String
    name) {
    }
    @Override
    public void onflexBeaconLost (final long nodeID, final String name)
    {
    }
};
flexBeaconClient.getInstance(context).getDiscoveryServices( ).
addDiscoveryListener(fdl);
```

The last part of the FlexBeacon SDK is the message listener shown in code excerpt below. It is used to listen for incoming messages and provides the capability to send messages.

```
private final flexBeaconMessageListener fml = new
flexBeaconMessageListener( ) {
    @Override
    public void onMessageReceived (long timestamp, long nodeID, String
    name, String type, int length, byte [ ] message) {
    }
    @Override
    public int sendMessage (long nodeID, String name, String verb,
    String
    type, int length, byte [ ] message) {
    }
};
flexBeaconClient.getInstance (context) .getMessageServices( ).
addMessageListener (fml);
```

MQTT SDK

In addition to the FlexBeacon SDK, discussed above, a MQTT SDK is also provided. The MQTT SDK has two parts, the MQTT client library and the MQTT server. These libraries run on top of TCP/IP protocol suite. These libraries provide APIs that are used to establish communication between the mobile devices and the message broker when they are out of the M2M communications range as shown in the following code excerpt.

```
//Create Mqtt client object which will connect to broker at
given URL and with clientID.
Mqttclient client = new MqttClient("tcp://IP_Address:Port",
"clientID")
//This method call will make a connection to the broker.
public void connect( )
//Publish path to path specified by string service.
public void publish(String service, Mqttmessage message)
//Disconnects from the server.
public void disconnect( )
//Returns the client ID used by this client.
public String getClientId( )
//Returns the address of the server used by this client, as a
URI.
public String getServerURI( )
//Get a service object which can be used to publish messages.
public MqttService getService(String service)
//Get list of services which can be used to publish messages.
public MqttService[ ] getServices(String service)
//Determines if this client is currently connected to the
server.
public boolean isConnected( )
```

-continued

```
//Sets the callback listener to use for events that happen
asynchronously.
public void setCallback(MqttCallback callback)
//Subscribe to a topic, which may include wildcards.
public void subscribe(String serviceFilter)
//Subscribes to a one or more topics, which may include
wildcards.
public void subscribe(String[ ] topicFilters)
//Requests the server unsubscribe the client from a topics.
public void unsubscribe(String[ ] topicFilter)
```

Theory of Operation

Figure 17:
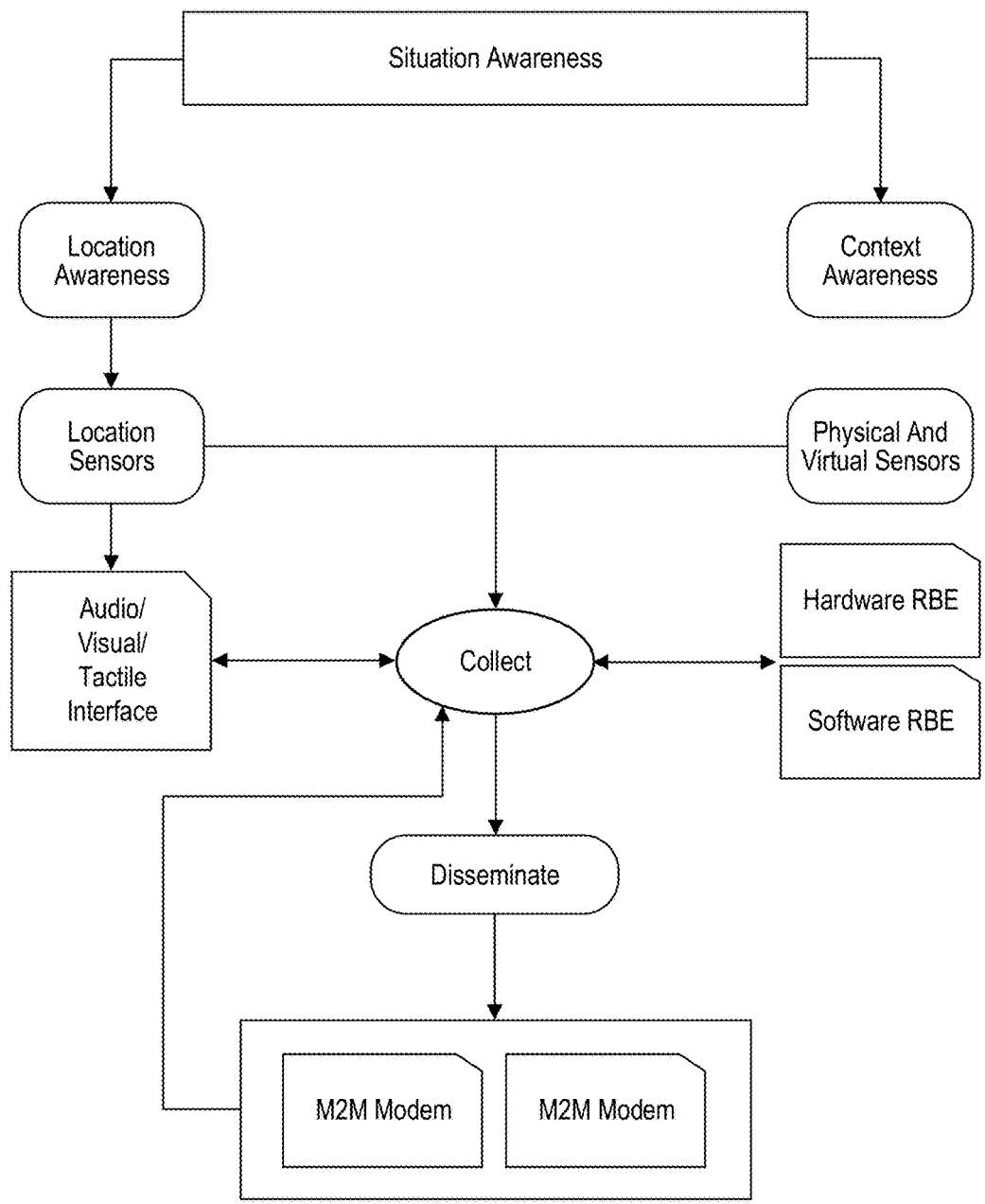
FIG. 17 is a high level platform diagram useful in understanding some of the advantages of the disclosed system.

From the foregoing it will be appreciated that the overall functionality of the FlexBeacon platform delivers user-defined and field-programmable location and context-aware services through the use of physical and virtual sensors supported by machine-to-machine communication. FIG. 17 illustrates some of the principles of the disclosed technology.

Unlike conventional beacon systems, the FlexBeacon system disclosed comprises a turnkey solution that includes integrated hardware and software components. The FlexBeacon platform allows nodes to transmit and receive beacons. The hardware of the FlexBeacon programmable block is versatile and supports a variety of M2M options including BLE, WiFi-Direct, and LTE-Direct. The hardware also provides a wide variety of ports and connections to sensors including GPIO, GPIB, CANBUS, OBD, USB, I2C, SSI/SPI, Fieldbus, and US232.

Developers can use the platform SDK to develop their applications from scratch or they can use a sophisticated graphical development environment which provides three unique editors: a GUI editor for designing user interfaces based on intelligent controls that have a novel feature called "virtual beaconing," a rule-based or data-flow editors for representing the logic of the application.

The FlexBeacon editor offers a visual rule composition application for monitoring beacons with the ability to apply rules to the data transmitted or received by these beacons through a simple and user friendly interface.

In addition, the FlexBeacon platform offers an analytics application to extract knowledge from the collected streaming and bulk data. We believe that the type of data collected by the FlexBeacon will enable new basic research in the area of "transient social networks." Such networks come to existence and then disappear quickly. Examples of such networks include these encountered in hospitals emergency rooms and work sites.

For example, in a hospital emergency room, doctors collaborate to work with a patient for some time and then they move to work with other patients. Analyzing the relationships between patient cases and the number and specialty of doctors can provide knowledge about the best mix of expertise needed to handle different patient cases. In construction sites, the "transient social network analysis" capabilities will provide insight into the best people to serve as liaisons between different teams. It will also help to identify redundancies and inefficiencies of equipment and personnel. The analytics capabilities afforded by the FlexBeacon platform will provide an important added value to businesses beyond the raw data and notification services provided by the FlexBeacon programmable block devices.

To more fully explore the many possibilities afforded by the FlexBeacon platform, several use cases will now be described. It will be understood that these are intended merely as examples and is not exhaustive of all uses for which the FlexBeacon platform can be deployed Hospital Use Case Hospitals utilize a variety of equipment for patient monitoring. Remote patient monitoring services allow doctors and nurses to gain remote access to the data collected by such monitoring devices. The flexBeacon hardware can be easily connected to existing medical equipment using one of the supported ports (e.g., through GPIB). This enables the FlexBeacon to broadcast the collected data through an M2M modem to interested users in proximity of the devices. From a user's perspective, a mobile application can be used by the doctors or the nurses to subscribe to data of interest. Data can also be made available remotely through the message broker. The following example illustrates how the platform can be used in conjunction with three medical devices and how doctors and nurses can easily configure the mobile application based on their needs.

In this scenario, a room in a hospital has three medical devices for measuring the patient's temperature, blood pressure, and heartbeat. One of the nurses wants to be alarmed when one of the following conditions occur:

1. Patient's temperature goes over 100 degrees Fahrenheit.
2. Patient's blood pressure drops down below 70 or goes above 120.
3. Patient's heartbeat goes over 100.

Figure 18:
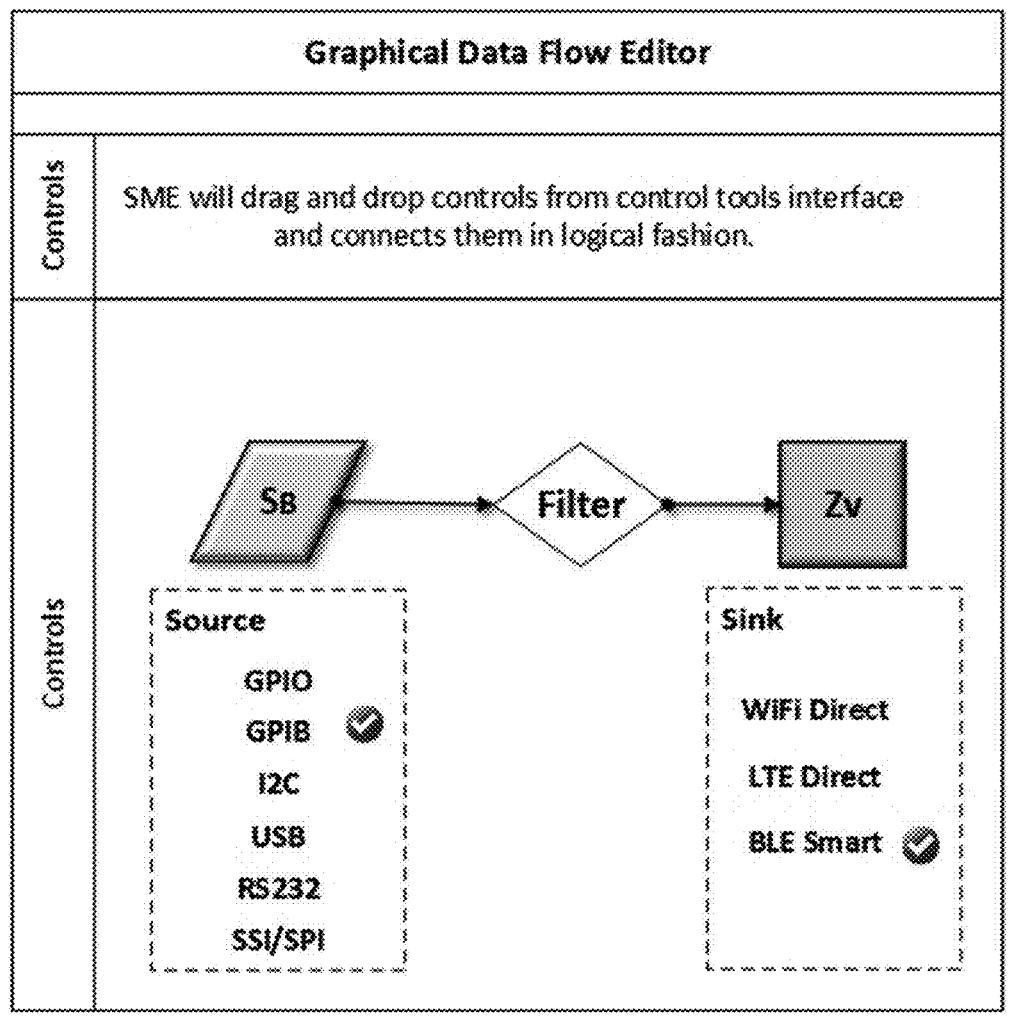
FIG. 18 illustrates the graphical data flow editor in an exemplary use case featuring data flow among medical devices.

The temperature device is connected to a FlexBeacon using a GPIB port, the blood pressure device is connected to a FlexBeacon using a USB port, and the heartbeat device doesn't provide any port connection but exposes the sensed data through a WebService with a specific URL. A third FlexBeacons grabs the heartbeat data from the specified WebService or URL through a WI-FI Internet connection. After setting up the FlexBeacon connections, three data-flow models are flashed into the FelxBeacons. The data-flow model for the temperature device consists of a source block representing the GPIB port where the data is received form, a second block for filtering the data, and a third block for sending the data over BLE M2M connection as shown in FIG. 18.

After installing the data-flow models on the FlexBeacon nodes and powering all the units, the nurse can start using her mobile application which initially displays three options: active monitors, direct services (rule), and broker services (rule). At this point, if the nurse selects active monitors her screen will be empty as no sensors are selected and a message is shown asking her to compose a rule on some sensors. So the nurse switches to direct services (rule) screen where FlexBeacons will be auto detected and displayed as shown in FIG. 19 at A.

Figure 19:
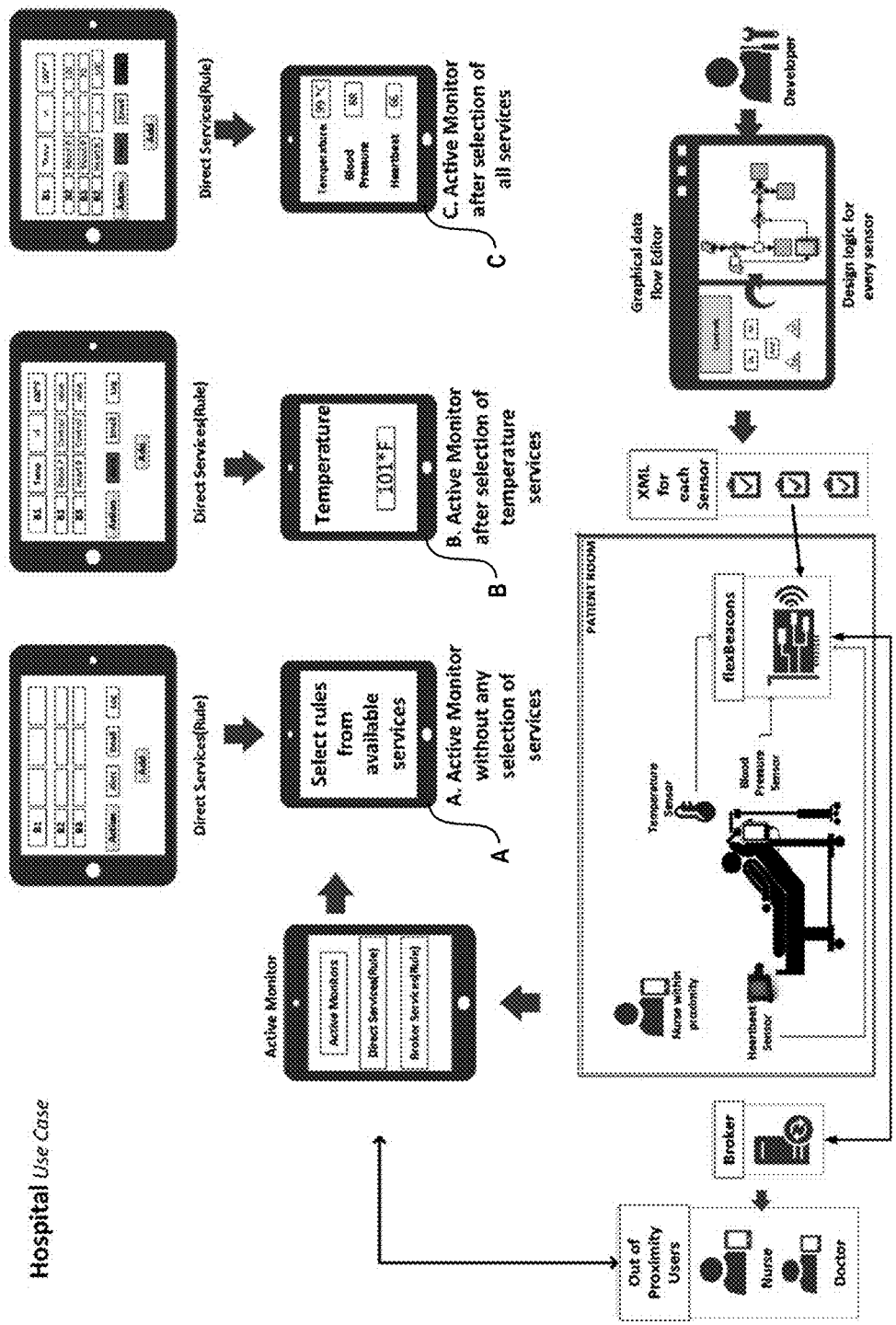
FIG. 19 is a use case flow diagram illustrating how the disclosed system might be deployed in a hospital use case.

In FIG. 19 at B, the nurse defines her first rule by selecting the temperature device and choosing the greater than sign from the control field, the value 100 in the value field, and choosing alarm in the action section. By doing so, the nurse created her first rule which sounds an alarm when the patient's temperature is over 100. When the nurse switches to the active monitors screen, only the temperature data is shown because only one rule has been created so far. Next, the nurse can create other rules as shown in FIG. 19 at C. The three devices' data will be available in the active monitors screen and once any of the specified conditions is triggered, the mobile device will sound an alarm.

If the nurse moves out of the direct proximity of the FlexBeacons, his or her mobile application will get the telemetry through the message broker instead of the M2M modem.

Figure 20:
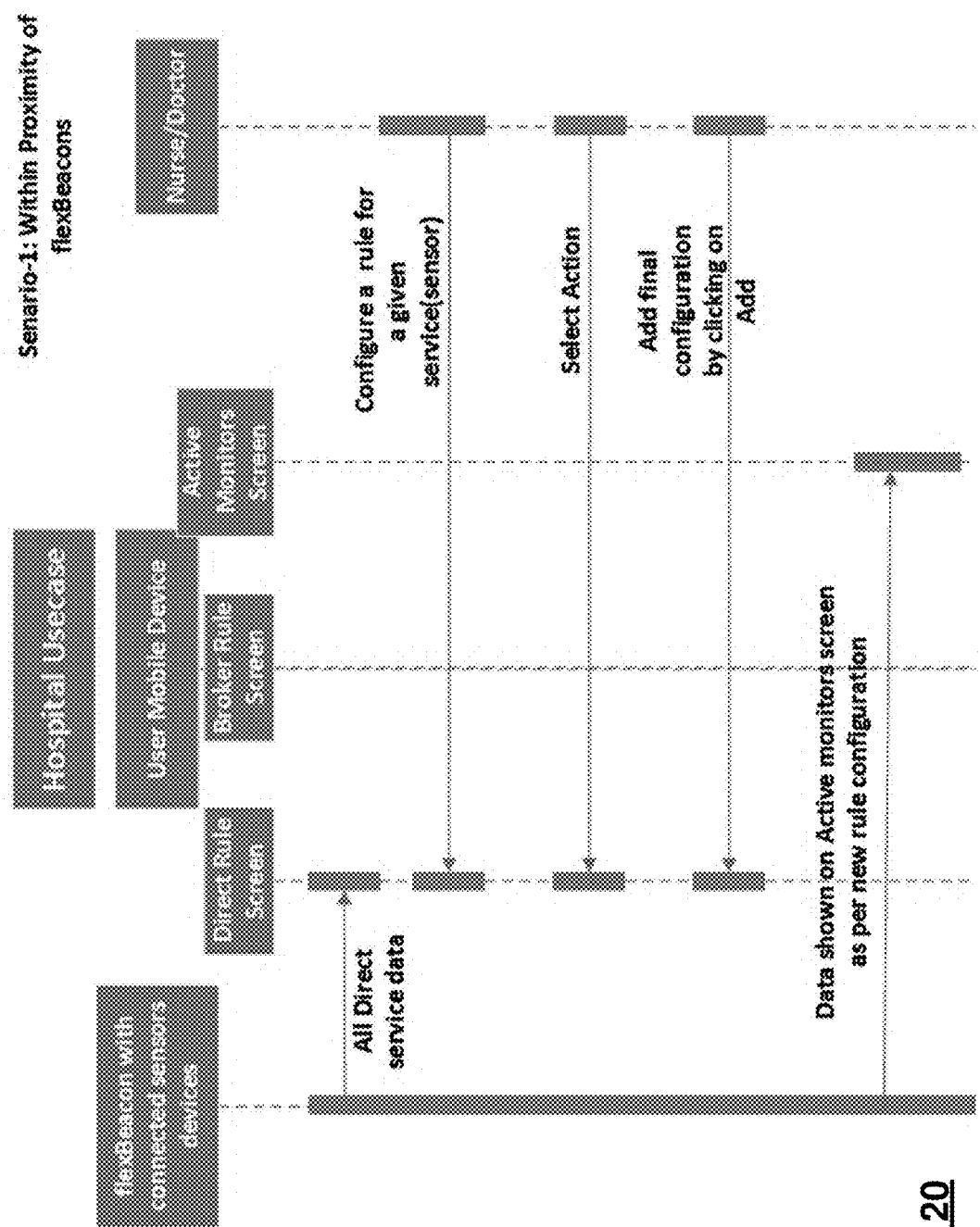
FIG. 20 is a sequence diagram showing exemplary communication between hospital users using programmable block devices and mobile devices within proximity (e.g., direct radio communication) to one another.

Referring to FIG. 20 a detailed sequential flow of events for the hospital use case has been illustrated relative to a first scenario where the end user is within the M2M communication range of the FlexBeacon nodes.

As illustrated in FIG. 20:
  a. The end-user device obtains all the available FlexBeacon telemetry.
  b. On the direct rule screen, the user will be able to see all the available services and configure a rule based on the listed services.
  c. The user selects an action to be triggered.
  d. The user clicks the add rule button and returns to the active monitors screen.
  e. All the telemetry data conveyed in the broadcast beacons will be visualized on the direct monitors screen as defined by the user.

Figure 21:
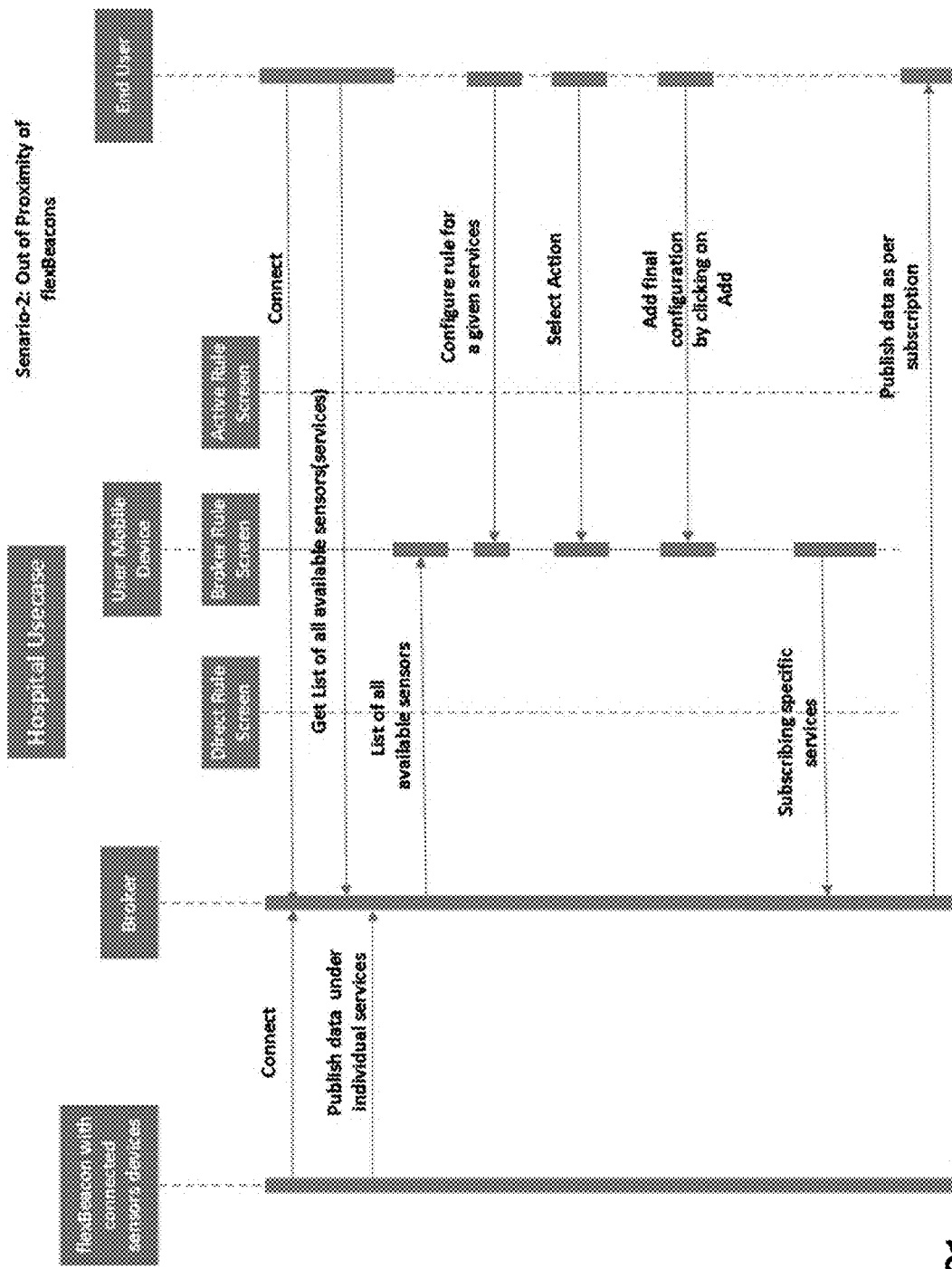
FIG. 21 is a sequence diagram showing exemplary communication between hospital users using programmable block devices and mobile devices when not within proximity (e.g., communicating using telecommunication or data network) to one another.

Now referring to FIG. 21, a second scenario is depicted where the end-user is out of M2M communication range of the FlexBeacon nodes. As illustrated in FIG. 21:
1. The FlexBeacon and the end-user devices connect to the message broker. Both will use the message broker API methods as shown below:

```
MqttClient client = new MqttClient("tcp://localhost:1883", "clientID");
client.connect( );
```

2. The FlexBeacon publishes all data under the service's URL.
  public void publish(Service URI, Data);
3. The end-user's device gets all the available services from the message broker.
  public List<services>getallservices(Path or Service URI);
4. On the message broker rule screen, the end-user sees a listing of all available services and configures a rule based on some of the listed services.
5. The end-user selects an action to be triggered.
6. The end-user clicks the add button and returns to the active monitors screen.
  This results in a subscription to the service of interest.
  Data data=client.subscribe("servicefilter");
7. The broker's data will be visualized on the direct monitors screen as defined by the user.

Bike Ride Use Case

Riding a bike can be a risky sport on routes with speedy vehicles and reckless drivers. Definitely, road signs, bike tracks, and driving carefully can contribute to protecting bikers. FlexBeacons can contribute to alerting bikers and drivers about their presence in the same proximity. Consequently, the proposed platform can help to save lives in this scenario.

Figure 22:
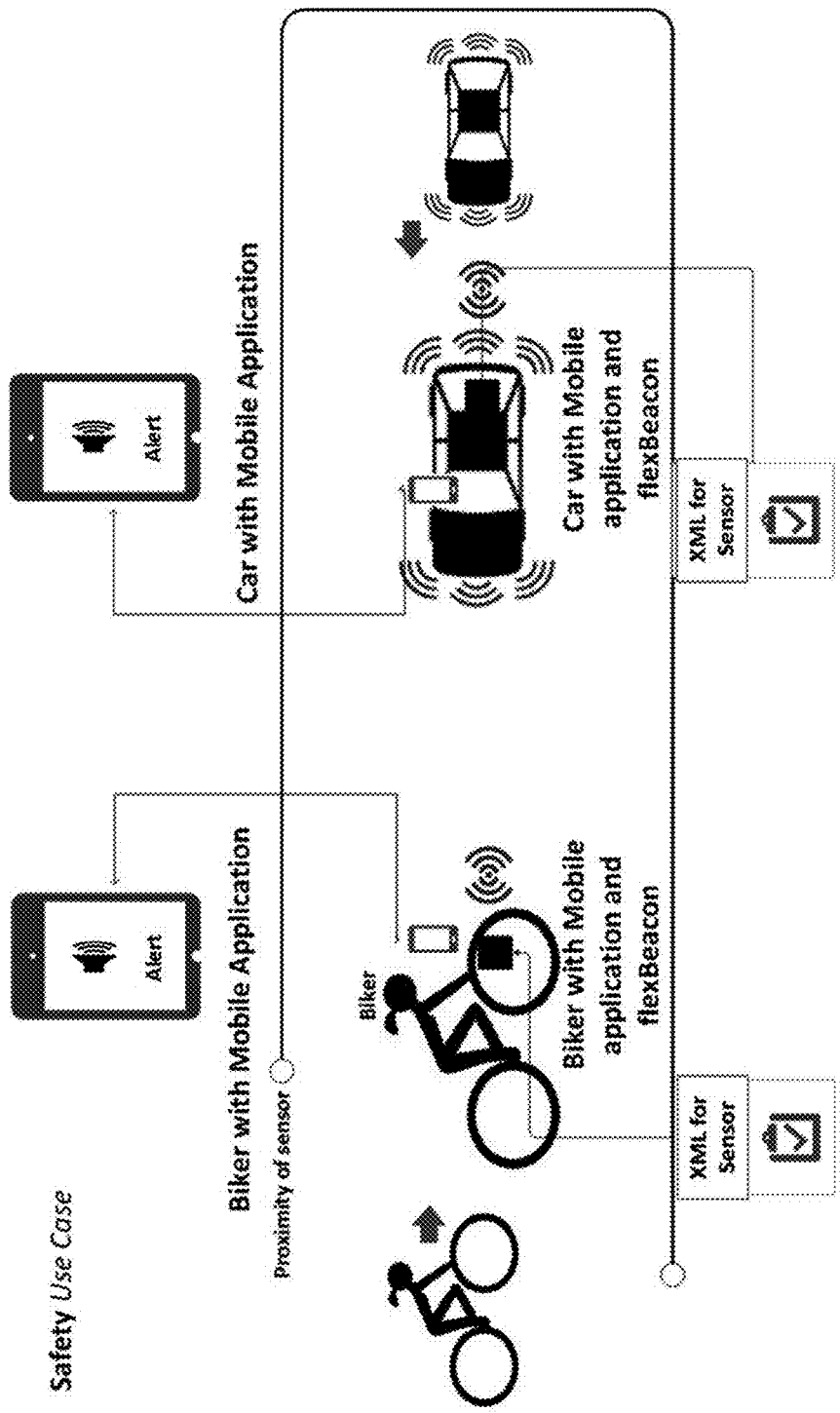
FIG. 22 illustrates another use case for bicycle safety.

In this scenario, FlexBeacons are installed on bike and vehicles. The data-flow program by all of the FlexBeacons is the same. Basically, the program broadcasts presence details (e.g., type and GPS location) while listening for other beacons. Bike beacons are advertised with a value of "bike" for the name field while vehicles are advertised with a value of "vehicle." Whenever a vehicle gets close to a bike and once they are within the M2M range, each of them are alerted about the presence of the other as illustrated in FIG. 22. This simple application can help to save lives and prevent potential accidents.

Figure 23:
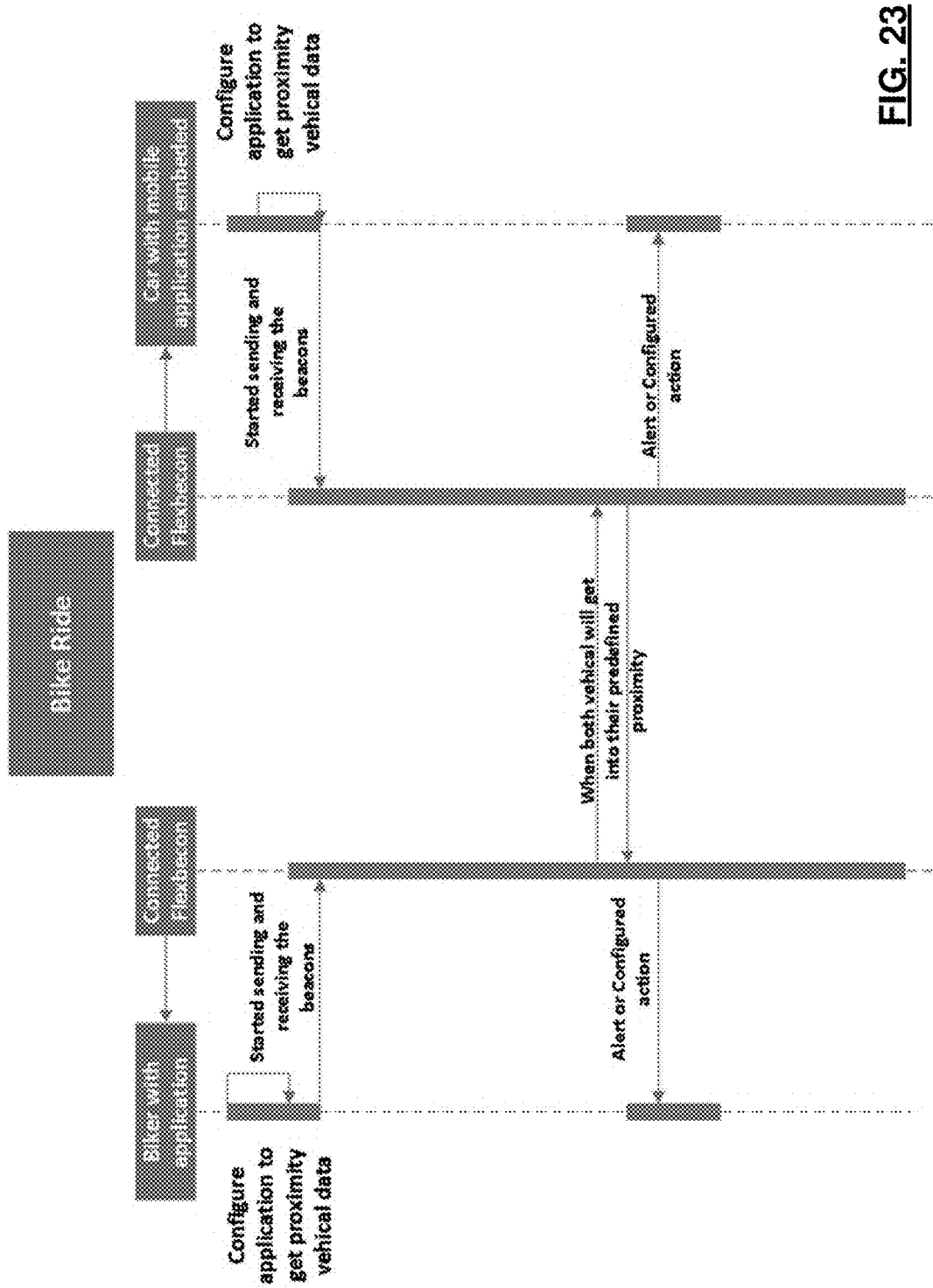
FIG. 23 is a sequence diagram showing exemplary communication within the bicycle safety use case of FIG. 22.

In this scenario, we assume one bike and one car equipped with Flexbeacons as shown in FIG. 23. In this case, the sequential flow of events will be as follows:
  a. The car and bike FlexBeacons are pre-configured to provide audio-visual or tactile alerts when "vehicle" or "bike" mounted FlexBeacons are in proximity.
  b. The FlexBeacon hardware generates broadcast messages that include the type (i.e., "vehicle," or "bike") and the GPS location.
  c. The rule-engine that executes on the FPGA will be continuously evaluating the separation distance between the different beacons and will signal to the micro-controller to trigger the corresponding alert when the separation distance is below a pre-defined target threshold.

Vehicle Exploitation Use Case

Many taxi companies complain about drivers abusing their vehicles either by stealing fuel or using the vehicle for personal use outside the work hours. The fuel theft issue has two different scenarios. The first scenario is when drivers drain the fuel from the vehicle's tank and the second scenario is when drivers buy fuel using the company's credit card without putting the fuel in the vehicle's tank (e.g., they sell it for an attractive price to other vehicles). Both scenarios can be dealt with using the proposed platform. In this example, the FlexBEacon is connected to the vehicle's OBD adapter to collect vehicle diagnostic information.

The first scenario can be detected by monitoring the fuel level sensor and the speed sensor because if the fuel sensor indicates a "significant" drop in the fuel level while the speed sensor indicates a zero speed then a fuel theft event is detected. Thus, the data-flow program reads both the fuel level and speed sensor data and logs them in the local storage. Next, when the vehicle gets close to the FlexBeacon deployed in the company's parking, the application which is hosted on the company's FlexBeacon downloads the logged data from the vehicle's FlexBeacon using M2M communications. Next, the application applies rules on the logged data to identify abuse cases. The rules for detecting a fuel theft in this scenario might be presented as follows:
  a. Fetch two successive logged packets for time T1 and T2.
  b. If the fuel level from the packet received at T1 is greater than the fuel level from the packet received at T2 and if the speed from the two packets is zero then a fuel theft event is detected.

The second scenario can be detected when the company's credit card is charged while the fuel level has not changed "significantly" compared to the collected credit card data. To translate this into a rule, two successive logged packets are examined for the status of the fuel level. If an SMS message is received during the same period indicating that the company's credit card has been charged, a fuel theft is detected when the fuel level of the tank does not change to commensurate with the credit card charges.

Figure 24:
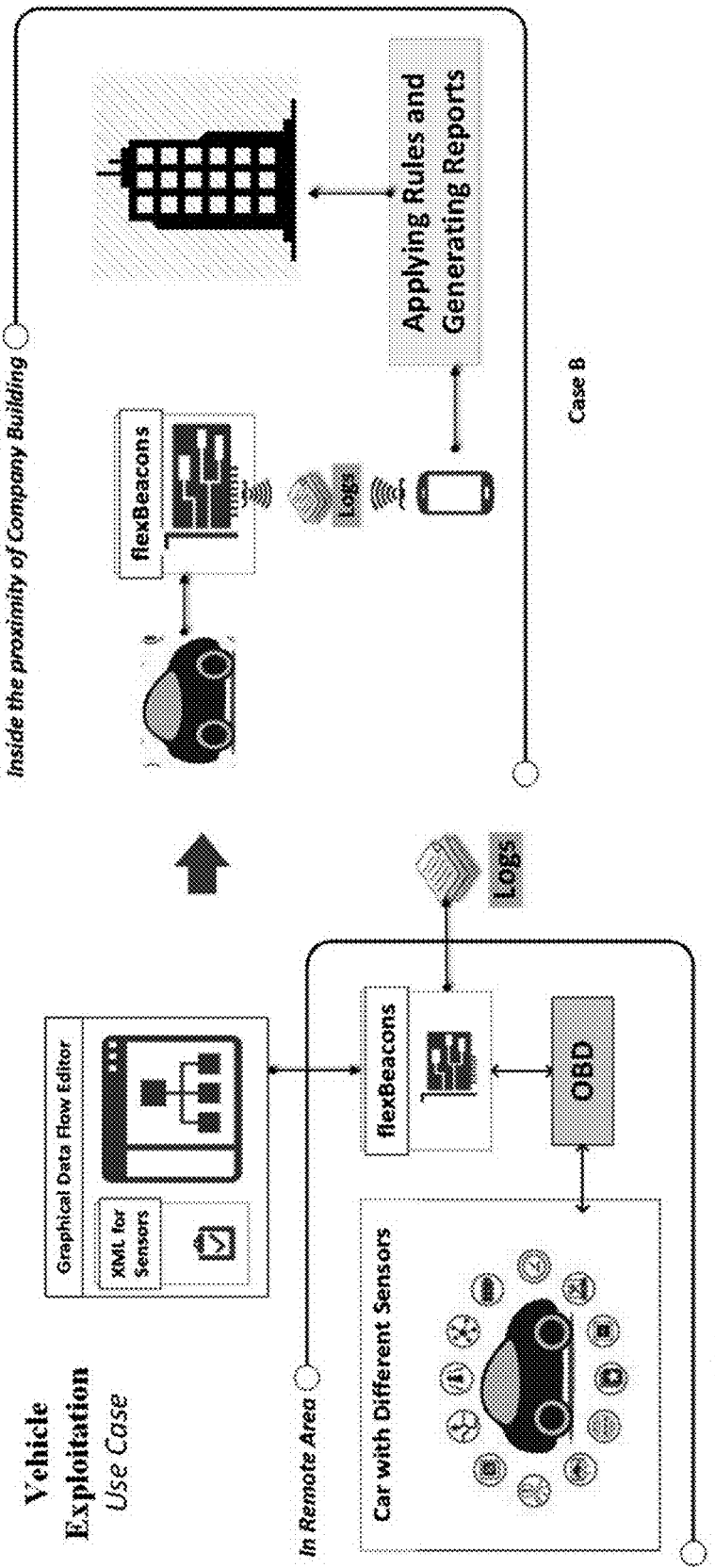
FIG. 24 illustrates yet another use case of vehicle exploitation.

Regarding the use of official vehicles outside the work hours, logged packets are checked by examining the engine status sensor and the time, so if the engine is on for a "significant" time outside the work hours then a vehicle abuse event is detected. FIG. 24—case A illustrates the vehicle with FlexBeacon logging telemetry while the vehicle is outside the company's lot. Also, FIG. 24—case B shows the vehicle entering the company's lot and the company's application fetching the logged telemetry from the vehicle-mounted FlexBeacon.

In this scenario, we have a vehicle with a FlexBeacon that is connected to the vehicles's OBD port. The FlexBeacon logs the collected telemetry from the OBD port to the internal flash memory.

Figure 25:
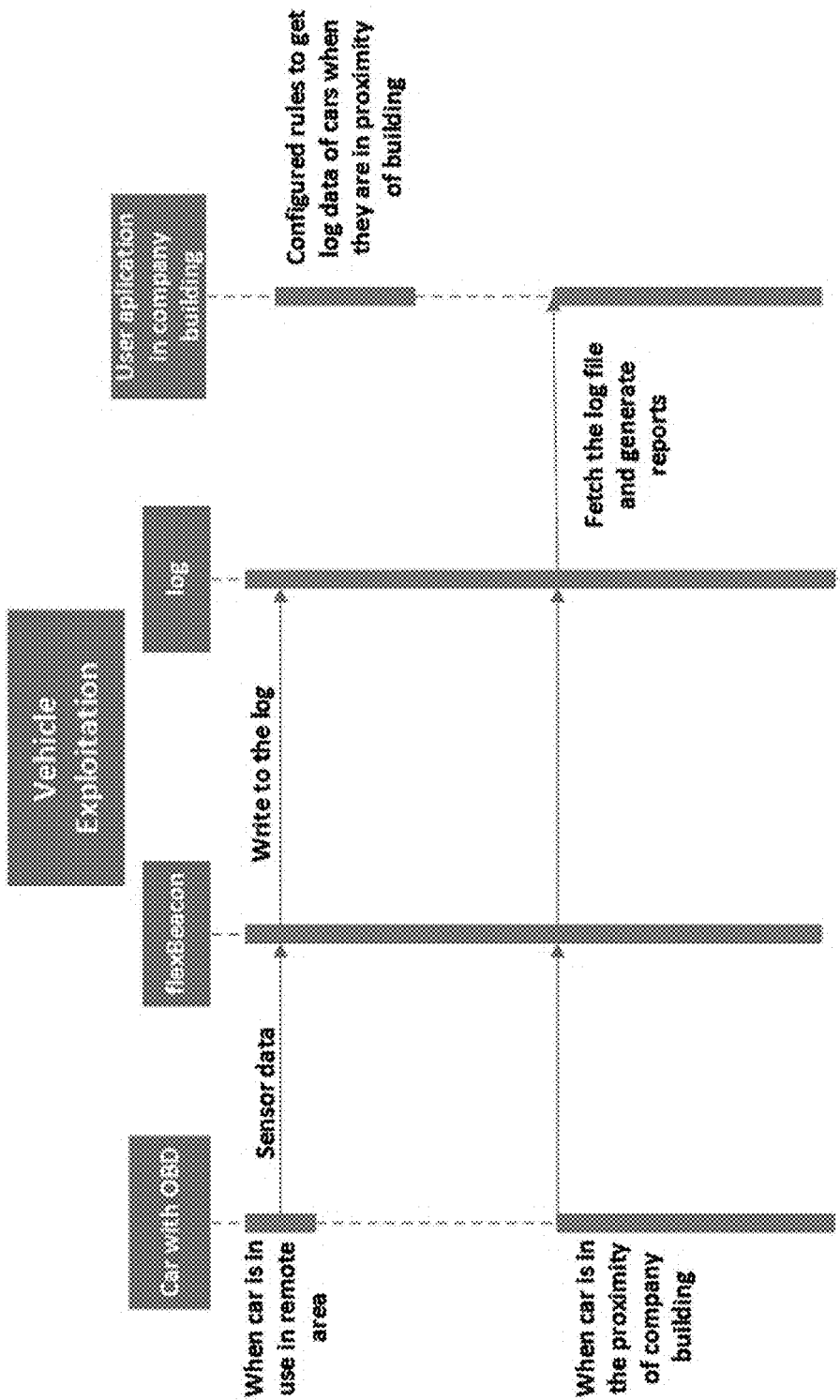
FIG. 25 is a sequence diagram showing exemplary communication within the vehicle exploitation use case of FIG. 24.

When the vehicle in proximity of the FlexBeacon that is mounted in the company's parking structure (a.k.a. the ferry FlexBeacon), the following sequence of events takes place (c.f. FIG. 25):

a. The company's vehicles are equipped with FlexBeacons with OBD connections.
b. The company deploys a ferry FlexBeacons in its parking structure to collect the data from the company's vehicles.
c. When a company's vehicle is in proximity, the ferry FlexBeacon downloads a bundle of data from the company's vehicle.

The application that runs of the company's FlexBeacon analyzes the collected data to generate reports and trigger notifications as needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A programmable communication system for use with a user device comprising:
   a programmable modular block device having:
      a processor programmed to implement an execution engine and further programmed to communicate with other processors using a predefined communication protocol,
      a device port with which to couple with at least one of a sensor and an actuator, and
      a communication port through which the processor can communicate with said user device and with other processors using said predefined communication protocol;
   a non-transitory machine-readable medium storing an editor program which when executed by a processor on said user device causes the processor on said user device to:
      discover and acquire first attribute information about the programmable modular block device,
      discover and acquire second attribute information about a second programmable modular block device,
      generate a rules-based program based on at least one of said first and second attribute information, and
      download said rules-based program to said programmable modular block device;
   wherein said programmable modular block device uses said execution engine to execute the rules-based program downloaded to it to obtain information through at least one of said device port and said communication port and to provide output data to affect at least one of provided control signals to said actuator, to provide information signals to said user device and to communicate with other programmable modular block devices.

2. The system of claim 1 wherein the non-transitory machine-readable medium further stores a rules-based compiler executed by the processor on said user device to generate said rules-based program.

3. The system of claim 2 wherein the compiler employs a rules-based language that specifies (a) a time scale, and (b) conditions needed to trigger an action.

4. The system of claim 1 wherein the non-transitory machine-readable medium further stores a rules-based compiler executed by a processor on a device other than said user device to generate said rules-based program.

5. The system of claim 1 wherein said programmable modular block program when executed by a processor on said user device causes the processor on said user device to operate on data advertised by said programmable modular block device.

6. The system of claim 1 wherein the programmable modular block program causes the processor on said user device to operate on data advertised by said programmable modular device on a broadcast channel that supports direct communication between the user device and the modular device.

7. A programmable communication system for use with a user device and with a message broker server comprising:
   a programmable modular block device having:
      a processor programmed to implement an execution engine and further programmed to communicate with other processors through said message broker server using a predefined communication protocol,
      a device port with which to couple with at least one of a sensor and an actuator, and
      a communication port through which the processor can communicate with said user device and with other processors using said predefined communication protocol;
   a non-transitory machine-readable medium storing an editor program which when executed by a processor on said user device causes the processor on said user device to:
      discover and acquire first attribute information about the programmable modular block device,
      discover and acquire second attribute information through said message broker server about a second programmable modular block device that is registered with said message broker server,
      generate a rules-based program based on at least one of said first and second attribute information, and
      download said rules-based program to said programmable modular block device;
   wherein said programmable modular block device uses said execution engine to execute the rules-based program downloaded to it to obtain information through at least one of said device port and said communication port and to provide output data to effect at least one of provide control signals to said actuator and to provide information signals to said user device.

8. The system of claim 7 wherein the non-transitory machine-readable medium further stores a rules-based compiler executed by the processor on said user device to generate said rules-based program.

9. The system of claim 8 wherein the compiler employs a rules-based language that specifies (a) a time scale, and (b) conditions needed to trigger an action.

10. The system of claim 7 wherein the non-transitory machine-readable medium further stores a rules-based compiler executed by a processor on a device other than said user device to generate said rules-based program.

11. The system of claim 7 wherein said programmable modular block program when executed by a processor on said user device causes the processor on said user device to operate on data advertised by said programmable modular block device.

12. The system of claim 7 wherein the programmable modular block program causes the processor on said user device to operate on data advertised by said programmable modular device on a broadcast channel that supports direct communication between the user device and the modular device.

13. A programmable communication system for use with at least one user device comprising:
- a non-transitory machine-readable medium storing a programmable modular block program which when executed by a processor on a user device causes the processor on said user device to implement:
- an execution engine programmed to execute a user-supplied rules-based program and programmed to communicate with other processors;
- wherein the rules-based program supports at least one of crisp, fuzzy and binary classifier-based rules that transcend operating on data locally sensed by the user device;
- a non-transitory machine-readable medium storing an editor program which when executed by a processor on a user device causes the processor on said user device to:
- discover and acquire first attribute information about the programmable modular block device,
- discover and acquire second attribute information about a programmable modular block device that is physically separate from said user device,
- generate said rules-based program based on at least one of said first and second attribute information, and via downloading said rules-based program into the user device processor environment, provide said rules-based program to said execution engine, where execution of the rules-based program provide control signals outputted by the execution engine to at least one sensor and one actuator under the control of said programmable modular block program.

14. The programmable communication system of claim 13 wherein said programmable modular block program and the editor program are executed by a processor on the same user device.

15. The programmable communication system of claim 13 wherein said programmable modular block program and the editor program are executed by processors on the physically separate user devices.

16. The programmable communication system of claim 13 wherein said programmable modular block program when executed by a processor on said user device causes the processor on said user device to advertise data to said programmable modular block device.

17. The programmable communication system of claim 16 wherein the programmable modular block program causes the processor on said user device to advertise data to said programmable modular block device on a broadcast channel that supports direct communication between the user device and the modular device.

18. The programmable communication system of claim 16 wherein the programmable modular block program causes the processor on said user device to advertise data to said programmable modular device through an intermediary message broker.

19. The programmable communication system of claim 13 wherein said programmable modular block program when executed by a processor on said user device causes the processor on said user device to operate on data advertised by said programmable modular block device.

20. The programmable communication system of claim 19 wherein the programmable modular block program causes the processor on said user device to operate on data advertised by said programmable modular device on a broadcast channel that supports direct communication between the user device and the modular device.

21. The programmable communication system of claim 19 wherein the programmable modular block program causes the processor on said user device to operate on data advertised by said programmable modular device through an intermediary message broker.

* * * * *